(12) United States Patent
Stingu et al.

(10) Patent No.: US 11,515,739 B2
(45) Date of Patent: Nov. 29, 2022

(54) FOD AND WIRELESS POWER TRANSFER CALIBRATION

(71) Applicant: Spark Connected LLC, Dallas, TX (US)

(72) Inventors: Petru Emanuel Stingu, Dallas, TX (US); Ruwanga Dassanayake, Dallas, TX (US); Yulong Hou, Shanghai (CN); Kenneth Moore, Dallas, TX (US)

(73) Assignee: SPARK CONNECTED LLC, Dallas, TX (US)

( * ) Notice: Subject to any disclaimer, the term of this patent is extended or adjusted under 35 U.S.C. 154(b) by 0 days.

(21) Appl. No.: 17/175,686

(22) Filed: Feb. 14, 2021

(65) Prior Publication Data
US 2021/0257864 A1 Aug. 19, 2021

Related U.S. Application Data

(60) Provisional application No. 62/976,963, filed on Feb. 14, 2020.

(51) Int. Cl.
*H02J 50/80* (2016.01)
*H02J 50/70* (2016.01)
*H04L 1/16* (2006.01)
*H02J 50/90* (2016.01)
*H02J 50/60* (2016.01)

(52) U.S. Cl.
CPC .............. *H02J 50/80* (2016.02); *H02J 50/60* (2016.02); *H02J 50/70* (2016.02); *H02J 50/90* (2016.02); *H04L 1/1657* (2013.01)

(58) Field of Classification Search
None
See application file for complete search history.

(56) References Cited

U.S. PATENT DOCUMENTS 3,376,578 A 4/1968 Sawyer
3,735,231 A 5/1973 Sawyer
(Continued)

OTHER PUBLICATIONS

Consumer Reports, "Wireless charging pad review We tested four popular pads to see whether they really make your life easier", Wireless Charging Pad Reviews, Dec. 11, 2013, 5 pages.
(Continued)

*Primary Examiner* — Daniel Kessie
(74) *Attorney, Agent, or Firm* — Slater Matsil, LLP

(57) ABSTRACT

In an embodiment, a method includes: wirelessly transmitting power using a transmitter LC tank to a wireless power receiver having a receiver LC tank; receiving a first received power packet from the wireless power receiver, the first received power packet including a received power value field indicative of a power level; determining a first power difference between transmitted power and received power based on the first received power packet; calculating a first received power compensation factor based on the first power difference; interrupting wirelessly transmitting power for a first slot period after receiving the first received power packet; performing a first measurement of a first signal associated with the transmitter LC tank during the first slot period; determining a first Q factor value based on the first measurement; comparing the first Q factor value with a reference Q factor value; and detecting a metallic object based on the comparison.

27 Claims, 9 Drawing Sheets

(56) References Cited

U.S. PATENT DOCUMENTS

| | | |
|---|---|---|
| 4,860,183 A | 8/1989 | Maeda et al. |
| 5,434,504 A | 7/1995 | Hollis et al. |
| 5,498,948 A | 3/1996 | Bruni et al. |
| 6,175,169 B1 | 1/2001 | Hollis, Jr. et al. |
| 6,184,651 B1 | 2/2001 | Fernandez et al. |
| 6,445,093 B1 | 9/2002 | Binnard |
| 6,803,744 B1 | 10/2004 | Sabo |
| 6,949,845 B2 | 9/2005 | Oisugi et al. |
| 8,049,370 B2 | 11/2011 | Azancot et al. |
| 8,193,769 B2 | 6/2012 | Azancot et al. |
| 8,957,549 B2 | 2/2015 | Kesler et al. |
| 9,590,444 B2 | 3/2017 | Walley et al. |
| 9,800,191 B2 | 10/2017 | Barsilai et al. |
| 9,853,441 B2 | 12/2017 | Feggatz et al. |
| 10,054,622 B2 | 8/2018 | Hernandez et al. |
| 10,079,090 B2 | 9/2018 | Teggatz et al. |
| 10,168,443 B2 | 1/2019 | Mangano et al. |
| 2006/0061323 A1 | 3/2006 | Cheng et al. |
| 2010/0181841 A1 | 7/2010 | Azancot et al. |
| 2010/0219183 A1 | 9/2010 | Azancot et al. |
| 2010/0244579 A1 | 9/2010 | Sogabe et al. |
| 2011/0050164 A1 | 3/2011 | Partovi et al. |
| 2011/0062793 A1 | 3/2011 | Azancot et al. |
| 2011/0074344 A1 | 3/2011 | Park et al. |
| 2011/0121660 A1 | 5/2011 | Azancot et al. |
| 2011/0227527 A1 | 9/2011 | Zhu et al. |
| 2012/0032632 A1 | 2/2012 | Soar |
| 2013/0049484 A1 | 2/2013 | Weissentern et al. |
| 2013/0082651 A1 | 4/2013 | Park et al. |
| 2013/0257172 A1 | 10/2013 | Teggatz et al. |
| 2013/0264973 A1 | 10/2013 | Garg et al. |
| 2013/0285601 A1 | 10/2013 | Sookprasong et al. |
| 2013/0300204 A1 | 11/2013 | Partovi |
| 2014/0080409 A1 | 3/2014 | Frankland et al. |
| 2014/0184150 A1 | 7/2014 | Walley |
| 2015/0115877 A1 | 4/2015 | Arai et al. |
| 2015/0142348 A1 | 5/2015 | Huang et al. |
| 2015/0249484 A1 | 9/2015 | Mach et al. |
| 2015/0341087 A1 | 11/2015 | Moore et al. |
| 2016/0149440 A1 | 5/2016 | Staring et al. |
| 2017/0163100 A1 | 6/2017 | Vocke et al. |
| 2019/0109498 A1 | 4/2019 | Stingu et al. |
| 2019/0190320 A1 | 6/2019 | Park |
| 2019/0296590 A1* | 9/2019 | Chae .................. H02J 7/02 |
| 2019/0319494 A1 | 10/2019 | Park et al. |
| 2019/0334388 A1 | 10/2019 | Van Wageningen et al. |
| 2021/0135506 A1* | 5/2021 | Muratov .............. H02J 50/12 |
| 2021/0273492 A1* | 9/2021 | Sherman .............. H04B 17/11 |

OTHER PUBLICATIONS

Digi-Key Electronics, "Inductive Versus Resonant Wireless Charging: A Truce May Be a Designer's Best Choice", Contributed By Digi-Key's North American Editors, Aug. 2, 2016, 8 pages.

Gao, Xiang, "Demodulating Communication Signals of Qi-Compliant Low-Power Wireless Charger Using MC56F8006 DSC", NXP Freescale Semiconductor Application Note, Document No. AN4701, Rev. 0, Mar. 2013, 21 pages.

Jansen, J. W., et al., "Overview of analytical models for the design of linear and planar motors", TU/e Eindhoven University of Technology, DOI: 10.1109/TMAG/2014.2328556, Jan. 1, 2014, 8 pages.

Johns, Bill et al., "Adapting Qi-compliant wireless-power solutions to low-power wearable products", Texas Instruments, High-Performance Analog Products, 2Q, 2014, Analog Applications Journal, 7 pages.

Kot, Thomas, "LC Sensor Rotation Detection with MSP430™ Extended Scan Interface (ESI)", Texas Instruments, Application Report, SLAA639, Jul. 2014, 33 pages.

Lynch, Brian T., "Under the Hood of a DC/DC Boost Converter", Texas Instruments, Power Supply Design Seminar, Paper SEM1800, Dallas, TX, USA, 2008-2009, 26 pages.

Rice, John, "Examining Wireless Power Transfer", Texas Instruments, 2014/2015 Power Supply Design Seminar, 38 pages.

Texas Instruments "Industry-Leading Wireless Power Solutions—The Most Widely Adopted in the Market", ti.com/wirelesspower, SLYT485C, 2013, 3 pages.

Texas Instruments, "Introduction to Wireless Power", Qi WPC 1.1 compliant, 49 pages.

Waters, Benjamin et al., "Optimal Coil Size Ratios for Wireless Power Transfer Applications", IEEE, Jul. 28, 2014, 4 pages.

Wikipedia, "Electromagnetic coil", https://en.wikipedia.org/w/index.php?title=Electromagnetic_coil&oldid=776415501, Apr. 20, 2017, 6 pages.

Wikipedia, "Inductive charging", https://en.wikipedia.org/w/index.php?title=Inductive_charging&oldid=802615270, Sep. 27, 2017, 7 pages.

Wikipedia, "Qi (standard)", https://en.wikipedia.org/w/index.php?title=Qi_(standard)&oldid=803427516, Oct. 2, 2017, 5 pages.

Zens, "Zens First Worldwide to Introduce Built-in Wireless (Sub-)Surface Charger with Apple and Samsung Fast Charge", Mar. 23, 2018, 5 pages.

Qi Wireless Power Consortium, "The Qi Wireless Power Transfer System Power Class 0 Specification Parts 1 and 2: Interface Definitions", Version 1.2.3., Feb. 2017, 165 pages.

Qi Wireless Power Consortium, "Introduction to the Power Class 0 Specification", Version 1.2.3., Feb. 2017, 16 pages.

Qi Wireless Power Consortium, "The Qi Wireless Power Transfer System Power Class 0 Specification Part 4: Reference Designs", Version 1.2.3 , Feb. 2017, 336 pages.

* cited by examiner

PRIOR ART

FOD AND WIRELESS POWER TRANSFER CALIBRATION

CROSS-REFERENCE TO RELATED APPLICATIONS

This application claims the benefit of U.S. Provisional Application No. 62/976,963, entitled "On-Demand Multi-Point FOD Calibration," and filed on Feb. 14, 2020, which application is hereby incorporated herein by reference.

This application is also related to U.S. patent application Ser. No. 17/020,537, entitled "Wireless Power Transfer Object Detection Circuit and Method," and filed on Sep. 14, 2020, and claiming priority to U.S. Provisional Application No. 62/899,607, entitled "Wireless Charging Circuit and Method," and filed on Sep. 12, 2019, which application are hereby incorporated herein by reference.

TECHNICAL FIELD

The present disclosure relates generally to an electronic system and method, and, in particular embodiments, to foreign object detection (FOD) and wireless power transfer calibration.

BACKGROUND

Wireless charging systems are becoming ubiquitous in today's society. For example, many smartphones and wearables implement wireless charging technology. Ease of use, greater reliability, spatial freedom, reduced connectors and openings, and the possibility of hermetically sealing are among the benefits offered by wireless charging. Wireless charging standards allow for interoperability between different devices and manufacturers. Some wireless charging standards, such as the Qi standard from the Wireless Power Consortium, and standards promoted by the AirFuel alliance, are becoming widely adopted. The Qi standard uses inductive charging operating between 80 kHz and 300 kHz to wirelessly transmit power from a transmitter to a receiver. Standards promoted by the AirFuel alliance use resonant wireless charging operating at 6.78 MHz to wirelessly transmit power from a transmitter to a receiver.

FIG. 1 shows exemplary wireless charging system 100. Wireless charging system 100 includes a transmitter (TX) device 102 that includes a transmitter coil $L_{TX}$, and a receiver (RX) device 104 that includes a receiver coil $L_{RX}$. The efficiency of the wireless power transmission generally depends on the coupling between the coil $L_{TX}$ and coil $L_{RX}$. The coupling between the coil $L_{TX}$ and coil is generally based on the relative position between the coil $L_{TX}$ and coil $L_{RX}$.

SUMMARY

In accordance with an embodiment, a method includes: wirelessly transmitting power using a transmitter LC tank to a wireless power receiver having a receiver LC tank; while wirelessly transmitting power, receiving a first received power packet from the wireless power receiver, the first received power packet including a received power value field indicative of a power level received by the wireless power receiver; determining a first power difference between transmitted power and received power based on the first received power packet; calculating a first received power compensation factor based on the first power difference; interrupting wirelessly transmitting power for a first slot period after receiving the first received power packet; performing a first measurement of a first signal associated with the transmitter LC tank during the first slot period; determining a first Q factor value based on the first measurement; comparing the first Q factor value with a reference Q factor value; and detecting a metallic object based on the comparison.

In accordance with an embodiment, a wireless power transmitter includes: a transmitter LC tank including a transmitter coil; and a controller configured to: cause the transmitter LC tank to wirelessly transmit power to a wireless power receiver; receive a first received power packet from the wireless power receiver, the first received power packet including a power received field indicative of a power level received by the wireless power receiver; determine a first power difference between transmitted power and received power based on the first received power packet; calculate a first received power compensation factor based on the first power difference; after receiving the first received power packet, cause an interruption in the wireless transmission of power from the transmitter LC tank for a first slot period; perform a first measurement of a first signal associated with the transmitter LC tank during the first slot period; determine a first Q factor value based on the first measurement; compare the first Q factor value with a reference Q factor value; and detect a metallic object on a charging field of the transmitter LC tank based on the comparison.

In accordance with an embodiment, a wireless power system includes: a wireless power receiver including a receiver LC tank; and a wireless power transmitter including a transmitter LC tank and a controller configured to: cause the transmitter LC tank to wirelessly transmit power to the receiver LC tank; receive a first received power packet from the wireless power receiver, the first received power packet including a power received field indicative of a power level received by the wireless power receiver; determine a first power difference between transmitted power and received power based on the first received power packet; calculate a first received power compensation factor based on the first power difference; after receiving the first received power packet, cause an interruption in the wireless transmission of power from the transmitter LC tank for a first slot period; perform a first measurement of a first signal associated with the transmitter LC tank during the first slot period; determine a first Q factor value based on the first measurement; when the first Q factor value and a reference Q factor value have a difference that is lower than a threshold, accept the first received power compensation factor as a calibration factor; and when the first Q factor value and the reference Q factor value have a difference that is higher than the threshold, detect a metallic object.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
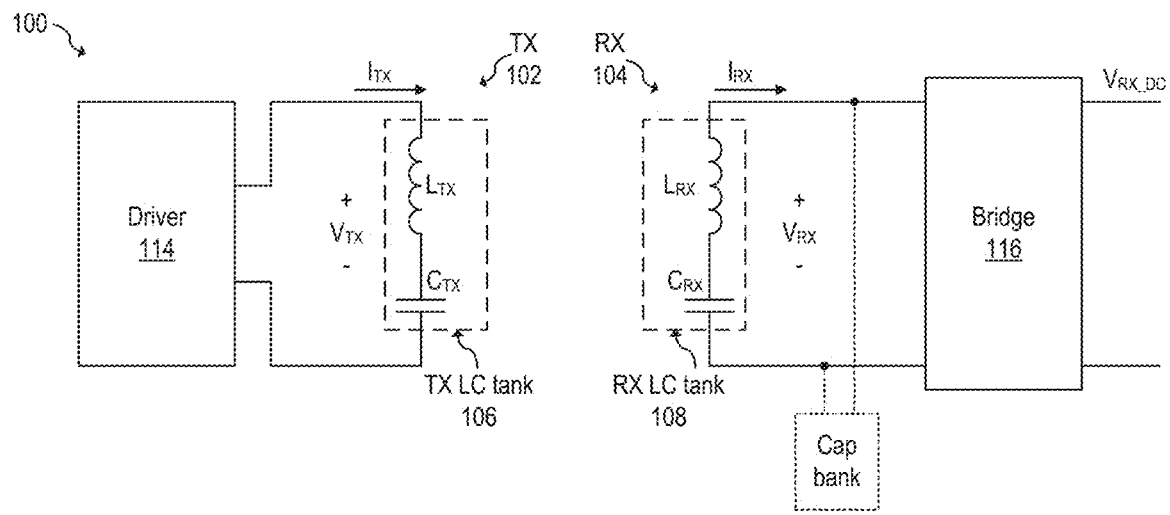
FIG. 1 shows an exemplary wireless charging system.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, FOD and wireless power transfer calibration (also referred to as FOD calibration). Embodiments of the present invention may be used in wireless power transmission systems that fully comply with one or more versions of the Qi specifications, as well as in wireless power transmission systems that only partially comply with one or more versions of the Qi specification, and in wireless power transmission systems that do not comply with the Qi specification, such as wireless power systems operating in other frequency ranges and according to other standard or custom wireless power transmission protocols.

It is understood that the term wireless charging is not limited to the charging of a battery, but includes wireless power transmission generally, unless stated otherwise.

In an embodiment of the present invention, FOD calibration may be performed at any point in time (on demand) during wireless power transfer while minimizing the risk of foreign or friendly objects entering the field of power transfer during the calibration. In some embodiments, a multi-point calibration is performed, which allows for additional calibration points at different load levels.

In some embodiments, FOD may be based on measurements of characteristics associated to the transmitter coil $L_{TX}$, such as inductance of the transmitter coil $L_{TX}$, the damping factor, and quality factor. To perform such measurements during normal operation, a wireless power transmitter may stop charging for a period of time (e.g., 100 μs to 200 μs) to perform such measurements. Such period of time may be called a micro-slot. During or based on measurements performed during the micro-slot, FOD detection may be performed by determining the power loss (e.g., due to the presence of a metallic object in the charging field).

As shown in FIG. 1, during wireless charging, a wireless charger transmitter (e.g., 102) transmits wireless power to a wireless power receiver (e.g., 104). It is often desirable to detect foreign objects (FOs), such as metallic foreign objects. For example, metallic objects exposed to the magnetic field generated by a wireless power transmitter may heat-up, thus producing a safety hazard, loss in wireless power transfer efficiency, and/or other effects. Thus, if the foreign object is detected, a wireless power transmitter may stop transmitting wireless power or reduce the power level of the wireless power transmitted.

A wireless power transmitter may perform foreign object detection (FOD). For example, FOD may be performed by calculating the power dissipated during wireless power transmission, and determining whether a foreign object is present if the dissipated power (e.g., the difference between the power transmitted ($P_{TX}$) by the wireless power transmitter 102 and the power received ($P_{RX}$) by the wireless power receiver 104) is larger than a threshold (e.g., 10% of transmitter power level).

Figure 2A:
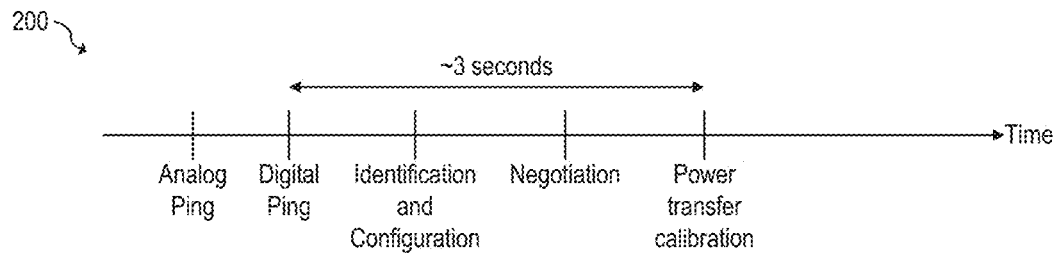
FIG. 2A shows a timeline of a conventional two-point extended power profile (EPP) mode calibration.
Figure 2B:
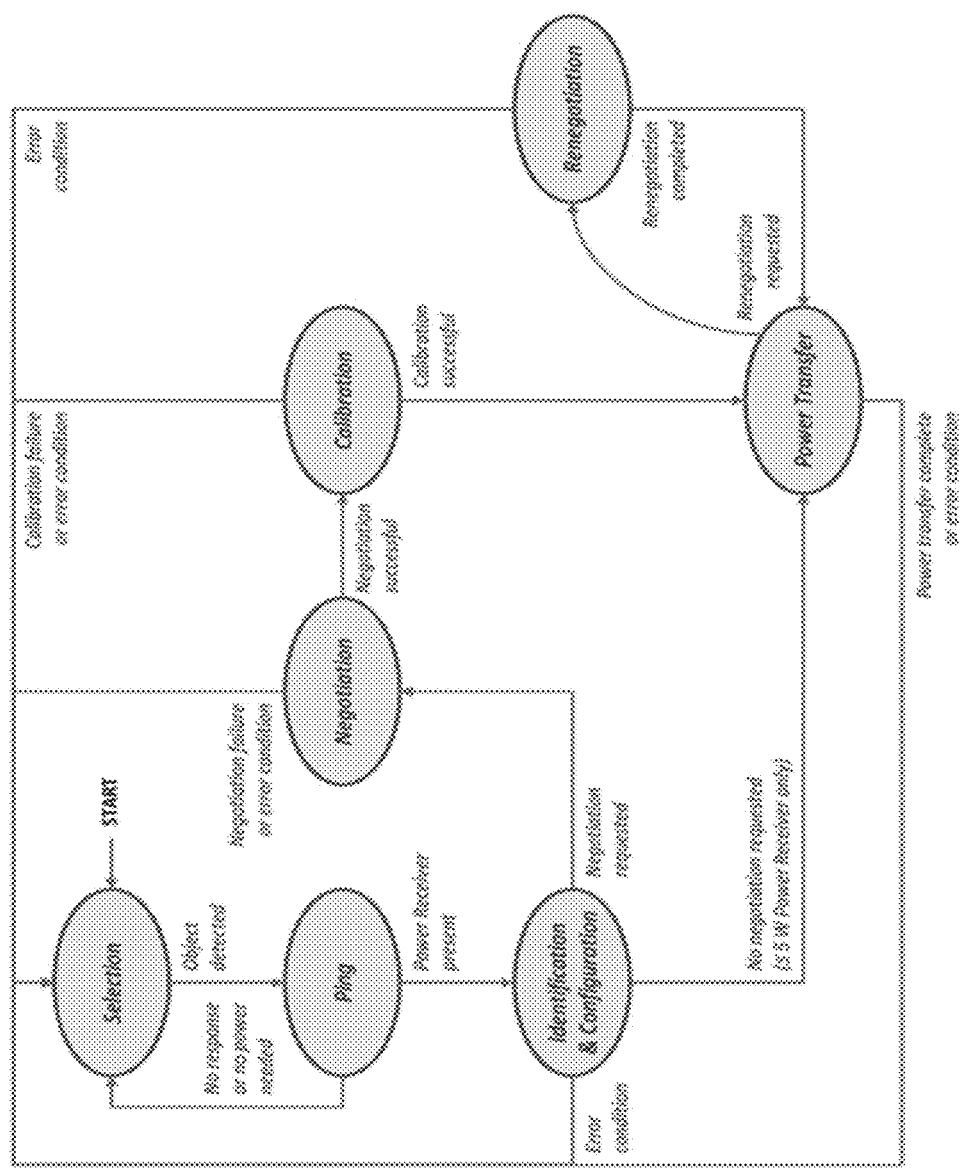
FIG. 2B shows a state diagram that illustrates the transitions between phases various phases of wireless power transfer protocol according to Qi specification 1.2.3.

To account for environmental differences, differences in RX 104 and TX 102 designs, and other variables, it is not uncommon for power transfer calibration to take place, e.g., to allow for properly detecting foreign objects. For example, FIG. 2A shows timeline 200 of a conventional two-point extended power profile (EPP) mode calibration. FIG. 2B shows a state diagram that illustrates the transitions between various phases of a wireless power transfer protocol according to Qi specification 1.2.3. FIG. 2A may be understood in view of FIG. 2B.

As shown in FIG. 2B, a startup sequence for wireless power transfer includes a selection phase, a ping phase, an identification and configuration phase, a negotiation phase and a calibration phase. Upon completion of the calibration phase, the power transfer phase begins. During the negotiation phase, power transfer levels are negotiated between the wireless power transmitter and the wireless power receiver.

As shown in FIG. 2A, the two-point EPP mode calibration includes a power transfer calibration step to calibrate differences between transmitted power ($P_{TX}$) and received power ($P_{RX}$). As shown, conventionally, the power transfer calibration step is performed a few seconds after the digital ping is transmitted. After the calibration step is performed, the power transfer phase begins, in which the wireless power transmitter transmits power to the wireless power receiver based on results from the negotiation phase, e.g., as illustrated in FIG. 2B.

Figure 3:
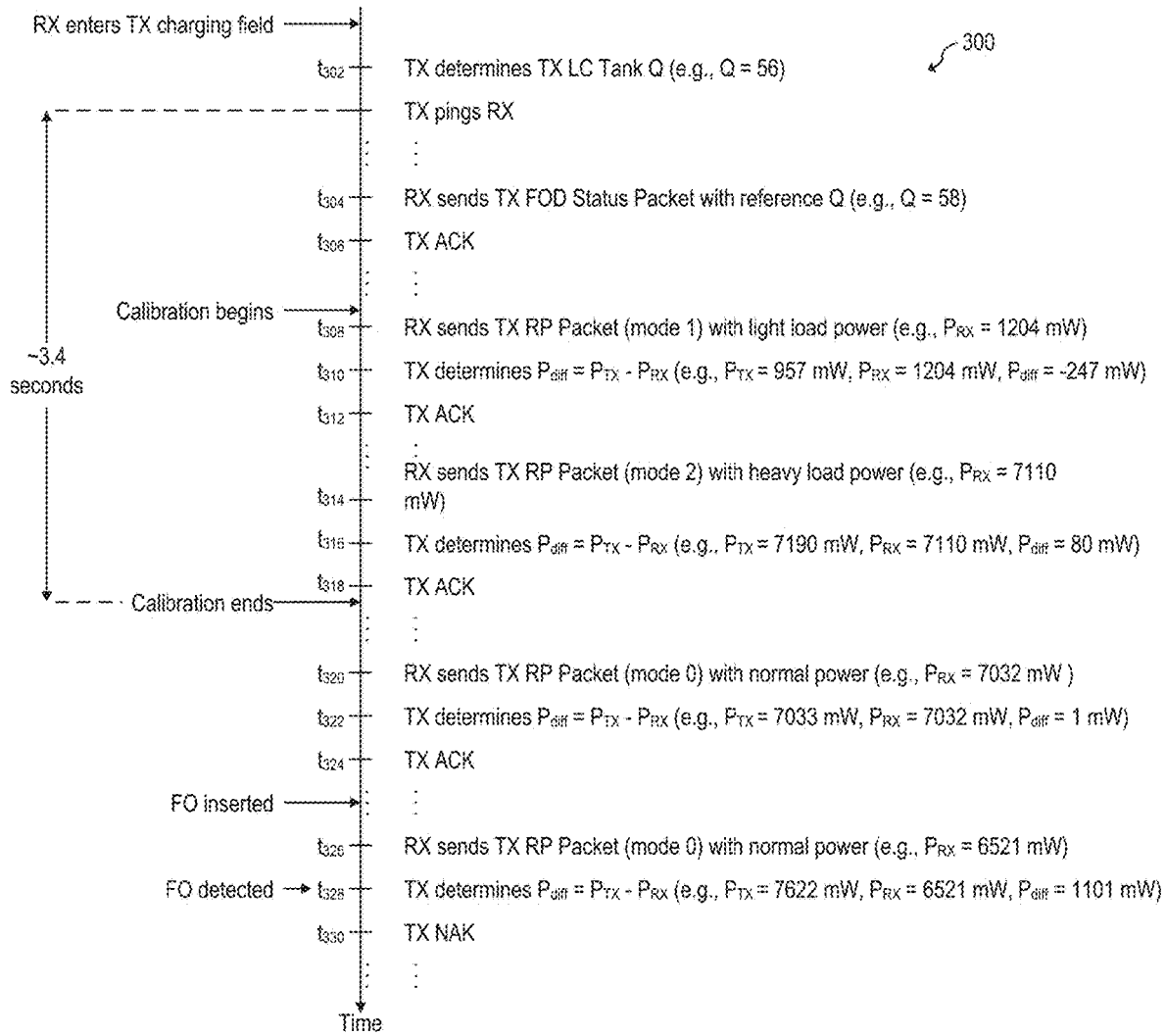
FIG. 3 shows an exemplary timeline of performing two-point EPP mode calibration.

FIG. 3 shows exemplary timeline 300 of performing two-point EPP mode calibration. Timeline 300 includes details about exchange of packets using in-band communication in a known manner between a wireless power transmitter and a wireless power receiver that comply with Qi specification version 1.2.3. Timeline 300 omits some details of the two-point EPP mode calibration for clarity purposes.

In some embodiments, each of the packets exchanged between the wireless power transmitter and the wireless power receiver include a header field, a message field, and a checksum field. Other formats, such as including additional fields and/or having a different arrangement, are also possible.

As shown in FIG. 3, the wireless power transmitter measures and determines the quality (Q) factor of the TX LC tank after the wireless power receiver enters the charging field of the wireless power transmitter (at time $t_{302}$).

At time $t_{304}$, the wireless power receiver sends an FOD Status packet (e.g., with header 0x22, and, e.g., mode 0, also referred to as FOD/qf packet) including a reference Q factor. The reference Q factor is generally determined by the manufacturer and represents the Q factor that a reference wireless power transmitter (e.g., such as a wireless power transmitter using an MP-A1 standard coil according to the Qi standard) would observe in the presence of the wireless power receiver in the absence of foreign objects. In some embodiments, such reference Q factor is stored in a non-volatile memory of the wireless power receiver. Since in the example illustrated in FIG. 3 the difference (56-58) between the Q factor measured at time $t_{302}$ and the Q factor received at time $t_3$ is lower than a threshold, the wireless power transmitter sends an acknowledge (ACK) to the wireless power receiver at time $t_{306}$.

In some embodiments, the FOD Status Packet may include a first byte that includes a mode field (e.g., 2 bits) indicative of the operating mode of the wireless power receiver, and a second byte that includes a reference quality factor value field (e.g., 8 bits) indicative of a reference quality factor of the wireless power receiver (e.g., in unsigned format). In some embodiments, when the mode field is 0 is indicative that the wireless power receiver is powered off. Other formats of the FOD Status Packet, such as including additional fields and/or additional bytes, and/or having a different arrangement, are also possible.

At time $t_{308}$, the wireless power receiver sends a Received Power (RP) packet (e.g., with header 0x31) for light loads (e.g., 1 W) including information about power received $P_{RX}$. At time $t_{310}$, the wireless power transmitter determines the difference $P_{diff}$ between the power transmitted $P_{TX}$ and the wireless power received $P_{RX}$. Since the difference $P_{diff}$ in this example is acceptable, the wireless power transmitter sends an acknowledgement to the wireless power receiver at time $t_{312}$. The difference determined at time $t_{310}$ is added as a compensation factor for future power transmission calculations.

In some embodiments, the Received Power packet may include a first byte that includes a mode field (e.g., 2 bits), and one or more additional bytes having a received power value field (e.g., 16 bits) indicative of the power level received by the wireless power receiver. The mode field of the RP packet may indicate a mode, e.g., as follows:

when mode is equal to 0, the value in the of the received power value field is indicative of a normal value, and a response from the wireless power transmitter is requested;

when mode is equal to 1, the value in the of the received power value field is indicative of a light load calibration value, and a response from the wireless power transmitter is requested;

when mode is equal to 2, the value in the of the received power value field is indicative of a connected load calibration value, and a response from the wireless power transmitter is requested; and when mode is equal to 4, the value in the of the received power value field is indicative of normal value, and a response from the wireless power transmitter is not expected. Other formats of the Received Power packet, such as including additional fields and/or additional bytes, and/or having a different arrangement, are also possible.

At time $t_{314}$, the wireless power receiver sends an RP packet for heavy loads (e.g., mode 2) including information about power received $P_{RX}$. At time $t_{316}$, the wireless power transmitter determines the difference $P_{diff}$ between the power transmitted P-x and the wireless power received $P_{RX}$. Since the difference $P_{diff}$ determined at time $t_{316}$ in this example is acceptable, the wireless power transmitter sends an acknowledge to the wireless power receiver at time $t_{318}$. The difference determined at time $t_{316}$ is also added as a compensation factor for future power transmission calculations.

The time between "calibration begins" and "calibration ends," as illustrated in FIG. 3, is also referred to as a calibration phase (e.g., as shown in FIG. 2B).

As shown by timeline 300 at times $t_{320}$, $t_{322}$ and $t_{324}$, after the calibration ends, the power difference Par determined in response to a RP packet (e.g., mode 0) is small when no foreign object is present in the charging field of the wireless power transmitter because of the compensation factors added based on the determinations at times $t_{310}$ and $t_{316}$. When a foreign object is inserted in the charging field of the wireless power transmitter after calibration, the power dissipated by such foreign object is reflected in difference $P_{diff}$ (e.g., as calculated at time $t_{328}$), and thus the wireless power transmitter may send a NAK (not acknowledged) to the wireless power receiver (at time $t_{330}$) as an indication that a foreign object was introduced in the charging field of the wireless power transmitter.

Figure 4:
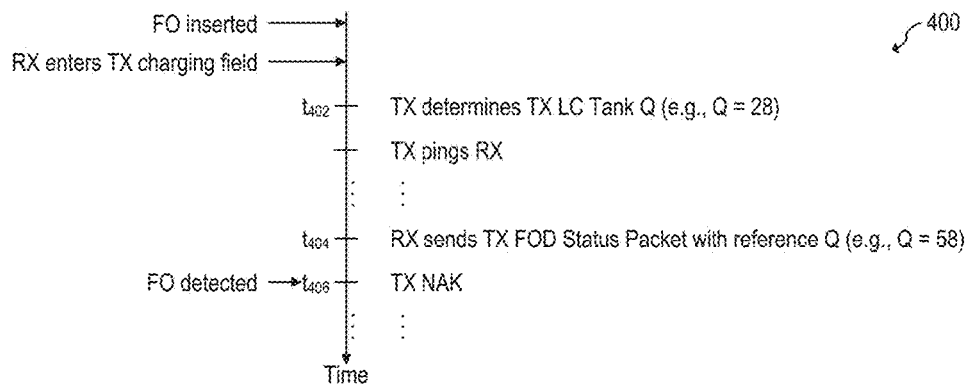
FIG. 4 shows an exemplary timeline of initiating wireless power transfer in the presence of a foreign object.

If a foreign object is present in the wireless charging field before the wireless power receiver is placed within the wireless charging field of the wireless power transmitter, the foreign object may be detected. For example, FIG. 4 shows exemplary timeline 400 of initiating wireless power transfer in the presence of a foreign object. Timeline 400 includes details about exchange of packets between a wireless power transmitter and a wireless power receiver that comply with Qi specification version 1.2.3. Timeline 400 omits some details for clarity purposes.

As shown in FIG. 4, the wireless power transmitter measures and determines the Q factor of the TX LC tank at time $t_{402}$. At time $t_{404}$, the wireless power receiver sends an FOD Status Packet (e.g., mode 0) including a reference Q factor. Since in the example illustrated in FIG. 4 the difference (28-58) between the Q factor measured at time $t_{402}$ and the Q factor received at time $t_{404}$ is higher than a threshold, the wireless power transmitter may send a NAK to the wireless power receiver (at time $t_{406}$) as an indication that a foreign object was introduced in the charging field of the wireless power transmitter.

Figure 5:
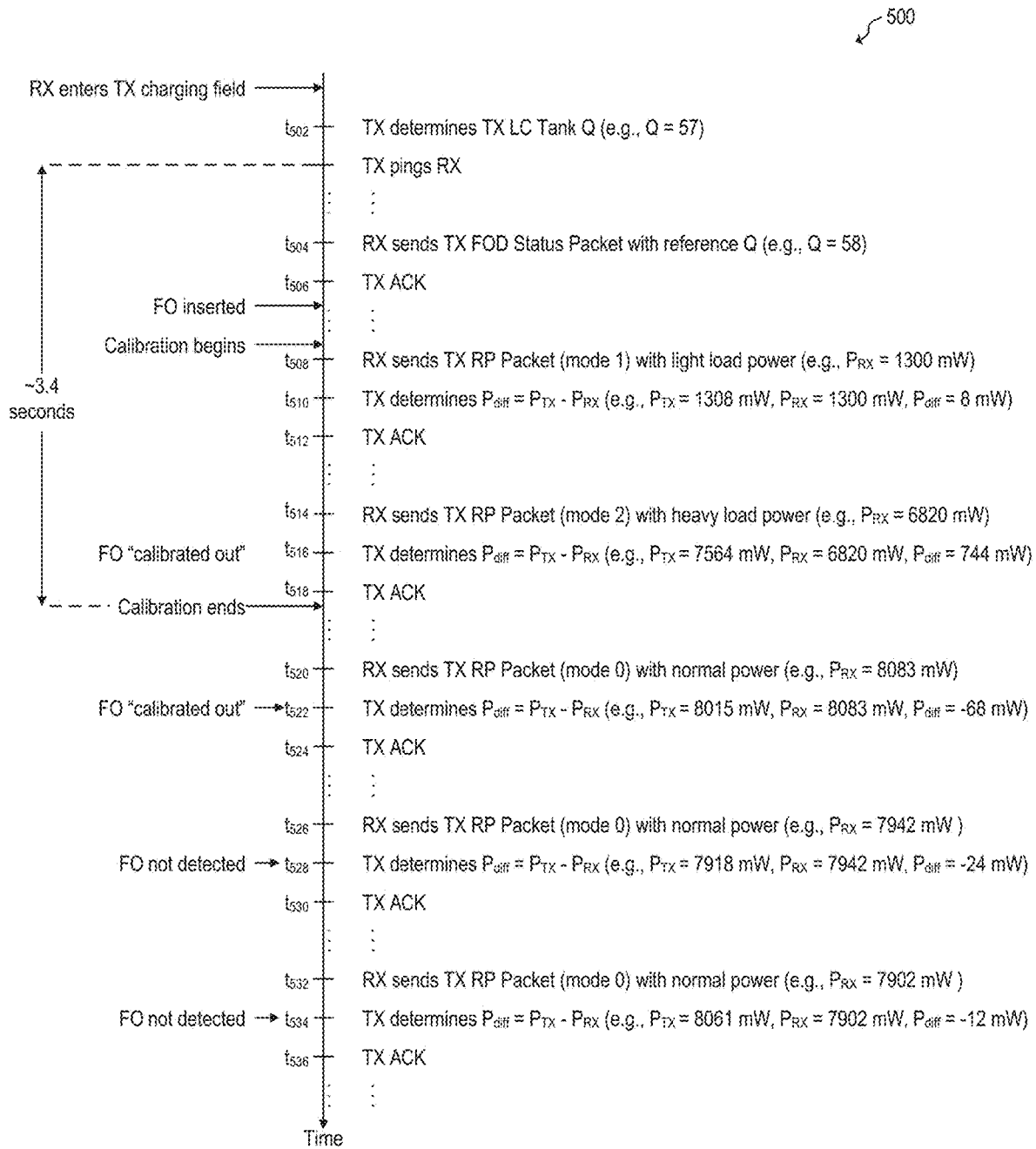
FIG. 5 shows an exemplary timeline of performing two-point EPP mode calibration when a foreign object is inserted before calibration starts but after the wireless power receiver enters the charging field of the wireless power transmitter.

Conventional two-point EPP mode calibration (e.g., as shown in FIG. 2A) can mask the detection of foreign objects and friendly objects by "calibrating them out." For example, the Qi specification version 1.2.3 or 1.2.4 do not provide the same robustness for FOD in EPP mode (e.g., 5 W max.) as it does in baseline power profile (BPP) mode (e.g., 15 W max.). For example, according to the 1.2.4 Qi Specification, two-point EPP calibration step is performed during a calibration state that follows the negotiation state. In some implementations, it may take up to 15 seconds between the beginning of power transfer to the finishing of the calibration step, which may allow metal objects to enter the field (e.g., before or during calibration), which may cause calibration errors. For example, foreign objects inserted into the field between time $t_{302}$ and time $t_{318}$ may be calibrated out. Moving the wireless power receiver during the calibration step may also introduce calibration errors by moving friendly objects in the field during calibration. For example, FIG. 5 shows exemplary timeline 500 of performing two-point EPP mode calibration when a foreign object is inserted before calibration starts but after the wireless power receiver enters the charging field of the wireless power transmitter. Timeline 500 includes details about exchange of packets between a wireless power transmitter and a wireless power receiver that comply with Qi specification version 1.2.3. Timeline 500 omits some details of the two-point EPP mode calibration for clarity purposes.

As shown by timeline 500, a foreign object inserted after the Q factor measurement (e.g., after $t_{502}$) and before the calibration ends (e.g., before $t_{518}$) may be calibrated out and thus not detected as a foreign object after calibration. For example, even though a difference $P_{diff}$ is found to be 744 mW at time $t_{516}$, such difference is compensated for, and later power dissipation calculations (e.g., as performed at times $t_{522}$, $t_{529}$ and $t_{534}$) fail to detect the foreign object.

As shown in FIG. 5, power dissipation at light loads may not be meaningful at heavy loads. Thus, a foreign object that causes acceptable losses at light loads (e.g., lower than 250 mW), may be calibrated out and still produce substantial losses at heavy loads (e.g., ~750 mW).

In an embodiment of the present invention, a Q factor measurement is performed shortly after the calibration ends (e.g., 200 ms after the calibration ends, such as 50 ms or less). Such Q factor measurement is used to determine if a foreign object is present during the calibration step based on the difference between measured and expected Q factor value for the TX LC tank and/or RX LC tank. If it is determined that a foreign object is present during the calibration step, the calibration compensation (determined during the calibration step) may be disregarded, and a foreign object may be detected. By performing Q factor measurements shortly after calibration ends, some embodiments advantageously minimize or eliminate the possibility that a foreign object is calibrated out.

Figure 6:
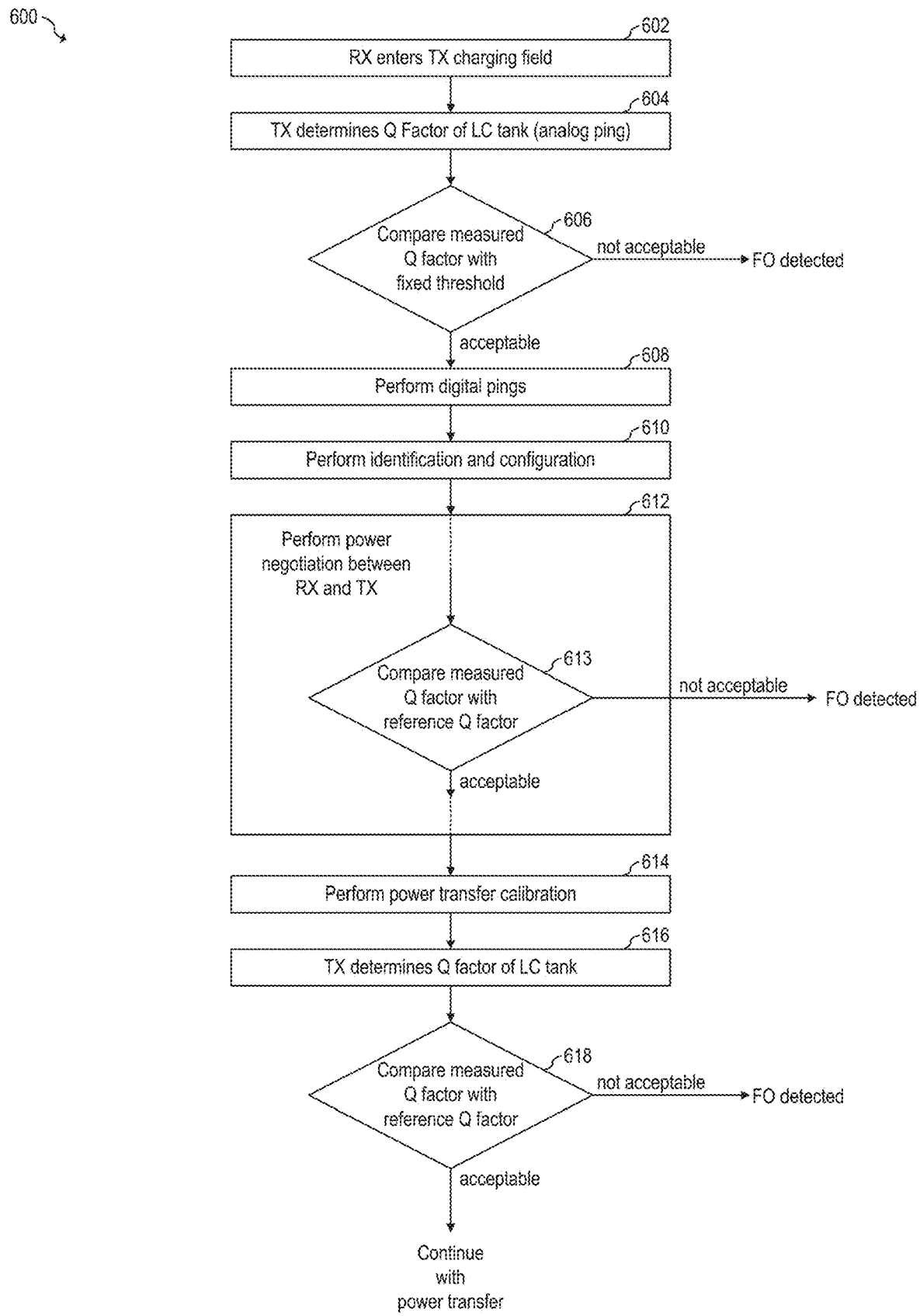
FIG. 6 shows a flow chart of an embodiment method for performing power transfer calibration, according to an embodiment of the present invention.

FIG. 6 shows a flow chart of embodiment method 600 for performing power transfer calibration, according to an embodiment of the present invention.

During step 602 a wireless power receiver enters the wireless charging field of a wireless power transmitter. For example, in some embodiments, a phone implementing a wireless power receiver is placed on a charging area of a wireless power transmitter.

In some embodiments, the hardware of the wireless power receiver and the wireless power transmitter comply with the Qi specification, such as Qi specification version 1.2.3 or 1.2.4.

During step 604, an analog ping is performed in which the wireless power transmitter determines a Q factor of the TX LC tank. For example, in some embodiments, the Q factor of the LC tank is determined based on the capacitance of the LC tank, the inductance of the LC tank, and on the resistance associated with the inductance of the LC tank. For example, in some embodiments, the quality factor Q may be determined by $$Q = \frac{1}{R} \cdot \sqrt{\frac{L}{C}} \qquad (1)$$

where C is the capacitance of the LC tank, L is the inductance of the LC tank, and R is the resistance associated with the inductance of the LC tank.

In some embodiments, the quality factor Q may be determined by $$Q = \frac{2\pi f_o L}{R} \qquad (2)$$

where $f_o$ is the resonance frequency of the LC tank.

In some embodiments, the quality factor is determined based on the damping coefficient of the LC tank (which may be measured based on the peaks of the oscillations produced by the LC tank. For example, in some embodiments, the quality factor Q may be determined by $$Q = \frac{1}{2\zeta} \qquad (3)$$

where $\zeta$ is the damping coefficient.

In some embodiments, the Q factor is determined by sampling (e.g., with an ADC) a transmitter current $I_{TX}$ while the TX LC tank is resonating and extracting the Q factor value from the sampled data (e.g., based on Equations 1, 2, and/or 3).

In some embodiments, the Q factor measurement performed during step 604 is performed during an analog ping (no load condition) where the voltage across transmitter coil $L_{TX}$ is, e.g., about 1 $V_{pp}$.

During step 606, the Q factor determined during step 604 is compared with a reference Q factor. For example, in some embodiments, a fixed Q factor, such as 20, is compared with the Q factor measured during step 604. If the difference between the measured Q factor and the received Q factor is lower than a Q factor threshold, then the Q factor is deemed acceptable. Otherwise the Q factor is deemed not acceptable and may be indicative that a foreign object is present in the charging field of the wireless power transmitter.

In some embodiments, the Q factor threshold is a fixed value. In some embodiments, the Q factor threshold is not a fixed value and may be based on one or more variables, such as signal strength, power transfer level, etc.

During steps 608, 610, and 612, digital pings, identification and configuration steps, and power negotiation steps between the wireless power receiver and transmitter may be performed, e.g., in accordance with the Qi specification (e.g., 1.2.3 or 1.2.4). In some embodiments, as one of the steps of the power negotiation phase 612, the Q factor determined during step 604 is compared with a reference Q factor, e.g., received from the wireless power receiver (during step 613). For example, in some embodiments, a reference Q factor received from the wireless power receiver in an FOD Status Packet (e.g., mode 0) is compared with the measured Q factor during step 604. If the difference between the measured Q factor and the received Q factor is lower than a Q factor threshold, then the Q factor is deemed acceptable. Otherwise the Q factor is deemed not acceptable and may be indicative that a foreign object is present in the charging field of the wireless power transmitter.

During step 614, power transfer calibration is performed. In some embodiments, results from the calibration, such as compensated value(s) to be applied to the power difference calculation may be stored in the wireless power transmitter (e.g., in volatile memory). In some embodiments, a single-point power transfer calibration is performed during step 614 (e.g., at light load only, or at heavy load only, or at another arbitrary point only). In some embodiments, a two-point power transfer calibration is performed during step 614, such as shown in FIG. 3 (e.g., between time $t_{308}$ and time $t_{318}$). In some embodiments, a multi-point power transfer calibration is performed during step 614. For example, in some embodiments, more than two points are used for performing calibration. For example, in some embodiments, three or more RP packets (e.g., with a mode value indicative of a calibration mode) are used at different power levels (e.g., 1 W, 2 W, 5 W, etc., or at 1 W, half negotiated power, and max negotiated power, etc.) to determine the compensation factors.

In some embodiments, RP packets (e.g., with mode 0) may be used to detect a foreign object, e.g., when $P_{diff}$ is higher than a power threshold (e.g., after the compensation is applied). In some embodiments, the power threshold is a fixed value (e.g., 10% of the power transmitter $P_{TX}$). In some embodiments, the power threshold is not a fixed value.

During step 616, the wireless power transmitter determines a Q factor of the TX LC tank. For example, in some embodiments, the wireless power transmitter determines the Q factor using Equations 1, 2, or 3. For example, in some embodiments, the Q factor is determined during step 616 by sampling (e.g., with an ADC) a transmitter current $I_{TX}$ and/or transmitter voltage $V_{TX}$ while the TX LC tank is resonating and extracting the Q factor value from the sampled data (e.g., based on Equations 1, 2, and/or 3). As will be described in more detail later, in some embodiments, the Q factor measurement performed during step 616 may be performed during a micro-slot.

During step 618, the Q factor determined during step 616 is compared with a reference Q factor, e.g., received from the wireless power receiver. For example, in some embodiments, a reference Q factor received from the wireless power receiver in an FOD Status Packet (e.g., with mode 0) is compared with the measured Q factor during step 618. If the difference between the measured Q factor and the received Q factor is lower than a Q factor threshold, then the Q factor is deemed acceptable (and is applied, e.g., in one or more subsequent power difference determinations, e.g., in response to RP packet(s)). Otherwise the Q factor is deemed not acceptable and may be indicative that a foreign object is present in the charging field of the wireless power transmitter. For example, in some embodiments, if the Q factor is determined to be not acceptable during step 618, the compensation factors calculated during step 614 may be removed (e.g., not applied in subsequence power difference determinations).

In some embodiments, the Q factor threshold is a fixed value. In some embodiments, the Q factor threshold is not a fixed value and may be based on one or more variables, such as signal strength, power transfer level, etc. For example, as will be described in more detail later, in some embodiments, the threshold is based on the proximity of the receiver coil $L_{RX}$ to the transmitter coil $L_{TX}$, which may be determined based on a (e.g., calibrated) Signal Strength packet received by the wireless power transmitter.

In some embodiments, the reference Q factor used during step 618 is the same as the reference Q factor used during step 606. In some embodiments, the reference Q factor used during step 618 is the same as the reference Q factor used during step 613.

In some embodiments, step 616 occurs very close in time with the end of the power calibration step 616. For example, in some embodiments, step 616 is performed within 200 ms or less, such as within 50 ms (or less, such as within 20 ms or less) of the end of the power calibration step 616. In some embodiments, the Q factor measurement performed during step 616 is performed with a charged or partly charged TX LC tank. Thus, in some embodiments, the Q factor measurement performed during step 616 may be different than the Q factor measurement performed during step 604 (e.g., since the TX LC tank may have little charge during step 604 and may have significant charge during step 616). Thus, some embodiments determine an expected heavy load reference Q factor based on a no load reference Q factor (e.g., used during step 604), and the heavy load reference Q factor is used during step 618 to determine whether a foreign object was inserted.

As shown in FIG. 6, method 600 is capable of detecting whether a foreign object is present during the power transfer calibration step 616. For example, if a foreign object is present in the charging field of the wireless power transmitter before step 604 is performed, then the foreign object may be detected during step 606 or 613. If the foreign object is inserted in the charging field of the wireless power transmitter after step 604 is performed and before step 616 is performed, then the foreign object may be detected during step 618. If the foreign object is inserted in the charging field of the wireless power transmitter after step 616 is performed, then the foreign object may be detected during power transfer (e.g., in a similar manner as illustrated in FIG. 3 at times $t_{326}$, $t_{328}$, and $t_{330}$).

In some embodiments, the time between the beginning of performing step 616 and finishing performing step 616 may be less than 50 ms, which minimizes or eliminates the chances that a foreign object is inserted or removed so as to cause a calibration error (e.g., to cause a foreign object to be calibrated out). Thus, some embodiments advantageously reduce (e.g., by two orders of magnitude) the time window in which a foreign object can be inserted in the charging field of wireless power transmitter and cause calibration errors (e.g., when compared with implementations having a time window e.g., between 3.4 seconds and up to 15 seconds, e.g., as illustrated in FIG. 5).

In an embodiment of the present invention, calibration is performed on-demand. In some embodiments, performing on-demand calibration advantageously allows the wireless power transmitter to adjust the calibration compensation when an operating condition changes. In some embodiments, a quality factor measurement is performed shortly after the calibration step to reduce or eliminate the risk of foreign or friendly objects entering the field of power transfer during the calibration.

Figure 7:
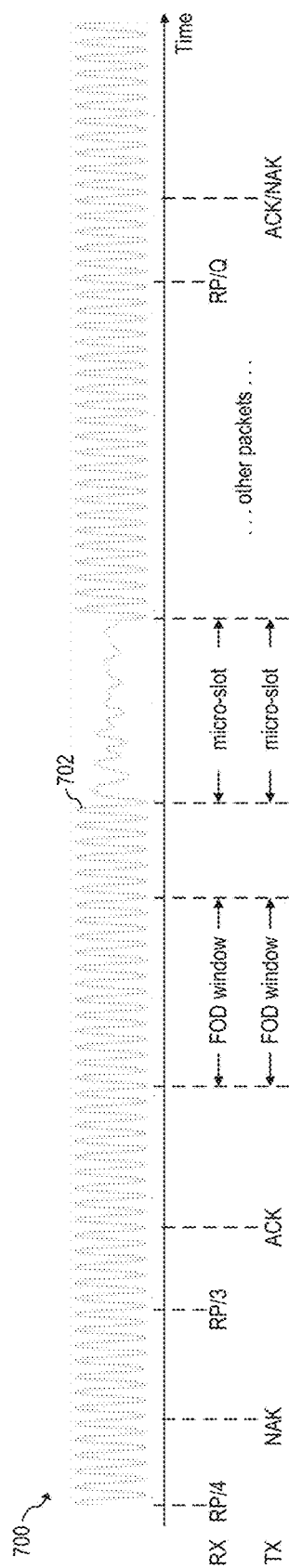
FIG. 7 shows a timeline for performing on-demand power transfer calibration, according to an embodiment of the present invention.

FIG. 7 shows timeline 700 for performing on-demand power transfer calibration, according to an embodiment of the present invention. Curve 702 corresponds to a TX LC Tank voltage (e.g., $V_{TX}$). Although the RP packets illustrated in FIG. 7 refer to specific modes, it is understood that other types of RP packets, and other values for the modes may also be used.

As shown in FIG. 7, during wireless power transfer (e.g., after 618), the wireless power receiver may send, e.g., periodically, or from time to time, a Received Power (RP) packet (e.g., with header 0x31) to the wireless power transmitter. An RP packet with mode 4 (RP/4) may report the current wireless power being received by the wireless power receiver without expecting a response from the wireless power transmitter.

In some embodiments, an RP packet with a mode 3 (RP/3) may be sent from the wireless power receiver to the wireless power transmitter. The RP/3 packet may be used to ask/request the wireless power transmitter to perform a power transfer calibration. If the wireless power transmitter acknowledges the request (e.g., sends an ACK to the wireless power receiver) a power transfer calibration may be initiated.

As shown in FIG. 7, if the power transfer calibration is initiated in response to an RP/3 packet, the power transfer calibration may be performed during the FOD window, and a quality factor measurement may be performed during a micro-slot following the FOD windows. In some embodiments, steps 614, 616, and 618 may be performed on demand. For example, in some embodiments, step 614 may be performed during the FOD window, step 616 may be performed during the micro-slot, and step 618 may be performed during the micro-slot or after the micro-slot.

In some embodiments, the FOD window and the Q factor measurement (performed in the micro-slot) are just a few milliseconds apart (e.g., 50 ms apart or less, such as 20 ms apart or less). Therefore, it is unlikely that foreign objects or friendly objects can enter the field so fast and cause errors in the calibration. Thus, some embodiments advantageously reduce (e.g., by two orders of magnitude) the time window in which a foreign object can be inserted in the charging field of wireless power transmitter and cause calibration errors, when compared to some implementations that comply with the Qi specification version 1.2.3 or 1.2.4.

In some embodiments, the calibration sequence shown in FIG. 7 may be started by the wireless power receiver or by the wireless power transmitter at any point during power transfer without the need to stop power for a long time. In some embodiments, therefore, there is no need to go through the full power-up sequence (Q factor measurement, ping, configuration, negotiation, power transfer calibration, and power transfer, e.g., as illustrated in FIGS. 2A and 2B) to redo calibration for a new operating point.

In some embodiments, after the micro-slot, the wireless power receiver may send, e.g., any type of packet. Therefore, such time can be used to process the sampled data obtained during the micro-slot.

In some embodiments, the wireless power receiver may send an RP mode Q (RP/Q) packet e.g., after a predefined interval from the end of the micro-slot, including information associated with the sampled data obtained during the micro-slot and/or FOD windows by the wireless power receiver. In some embodiments, such interval may be around 200 ms, e.g., to allow for power level stabilization after the micro-slot and also to allow the wireless power receiver and the wireless power transmitter to process the information collected during the FOD window and during the micro-slot (e.g., reported in the RP/Q packet). In some embodiments, the RP/Q may report information about the RX LC tank, TX LC tank, and/or average power received during the FOD window. In some embodiments, information of the RP/Q packet may be used by the wireless power transmitter to make the determination of whether an object is present (e.g., during step 618). In some embodiments, if the wireless power transmitter determines, in response to the RP/Q packet, that a foreign object is present, the wireless power transmitter may send a NAK, and, in response, the wireless power receiver may reduce its power consumption.

In some embodiments, the wireless power receiver may send the RP/3 packet(s) during the Power Transfer phase to initiate a calibration sequence if the operating point of the wireless power receiver changes or as a response to consecutive NAKs received after RP/o packets sent by the wireless power receiver. By periodically, or from time to time, sending RP/3 packets, some embodiments advantageously give the wireless power transmitter the opportunity to request a calibration sequence (by sending an ACK in response to the RP/3 packet).

In some embodiments, the RP/3 packet includes a flag field to indicate if the wireless power receiver is requesting a calibration sequence or if the RP/3 packet is being sent to poll the wireless power transmitter to give the wireless power transmitter the opportunity to request a calibration. In some embodiments, the wireless power transmitter responds to the RP/3 packet with ACK if the wireless power transmitter agrees to start a calibration sequence or with a NAK if it does not want to start the calibration sequence. In some embodiments, the wireless power receiver may reduce its power consumption in response to a NAK from the wireless power transmitter responding to the RP/3 packet.

In some embodiments, there may be a delay between the FOD window and the micro-slot to prevent incorrect power measurements due to timing misalignment between the wireless power transmitter and the wireless power receiver. In some embodiments, such delay may be, e.g., of 10 ms or less.

As shown in FIG. 7, in some embodiments, the FOD window is scheduled after the RP/3 packet. In some embodiments, the start of the FOD window may be synchronized with the start bit of the RP/3 packet or with the bit transitions of the ACK response from the wireless power transmitter. Thus, in some embodiments, the wireless power transmitter and the wireless power receiver may take simultaneous measurement of the transmitted/received power during the FOD window.

In some embodiments, a two-point EPP calibration (e.g., light load and heavy load calibrations) may be performed on-demand using RP/3 packets. For example, in some embodiments, the calibration for light load is performed by using a first RP/3 packet indicating the received power measurement at the wireless power receiver at light load. After the RP/Q is transmitted, a second RP/3 packet is received by the wireless power transmitter indicating the received power measurement at the wireless power receiver at heavy load.

In some embodiments, the calibration sequence may be performed on-demand for multiple operating points (each operating power level). At each operating power level, an RP/3 packet indicating the received power measurement at the wireless power receiver is received by the wireless power transmitter. Thus, the sequence illustrated in FIG. 7 (e.g., RP/3, ACK, FOD window, . . . other packets . . . , RP/Q, ACK/NAK) may be performed for two-point calibration (e.g., the sequence executed twice), for multi-point calibration (e.g., the sequence executed once for each of the multi-points of the multi-point calibration), or for a single-point calibration (e.g., the sequence executed once for an arbitrary or predetermined operating power level).

In some embodiments, a calibration of more than one operating power level may be performed in a single FOD window (e.g., by adjusting the power transmission level in a synchronized and predetermined manner).

Figure 8:
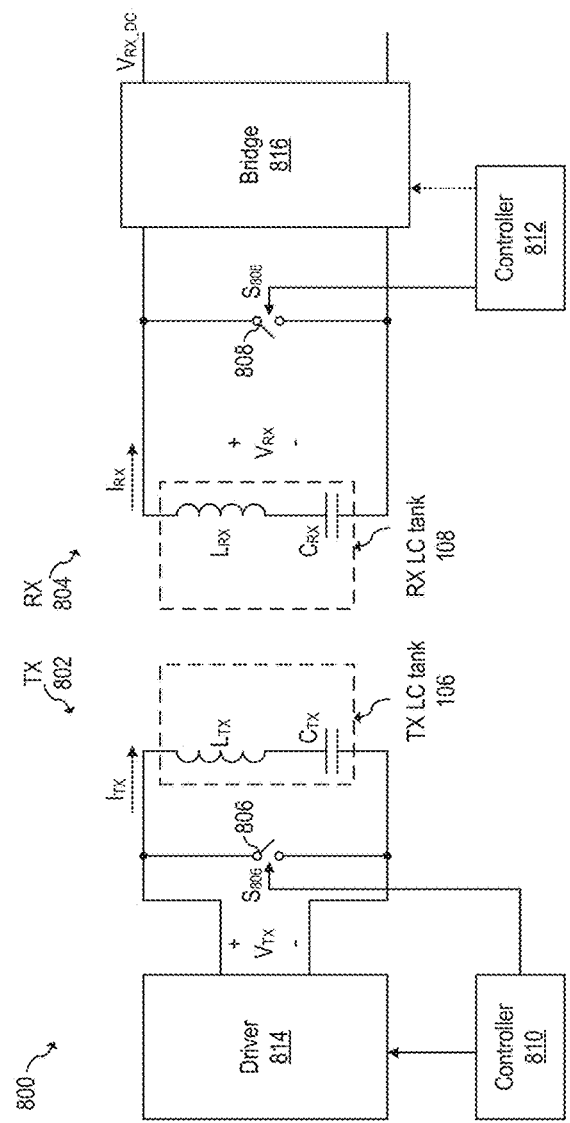
FIG. 8 shows a wireless charging system, according to an embodiment of the present invention.

In some embodiments, the wireless power transmitter and/or the wireless power receiver short their respective LC tanks during the micro-slot, e.g., to perform one or more measurements associated with determining a Q factor. For example, FIG. 8 shows wireless charging system 800, according to an embodiment of the present invention. Charging system 800 may implement method 600.

Wireless power transmitter 802 may be implemented, e.g., with a charging surface. In some embodiments, the wireless power transmitter 802 includes a plurality of transmitting coils LTX. In some embodiments, the wireless power transmitter is implemented as a sub-surface wireless power transmitter (e.g., underweight a table or behind a wall). In some embodiments, wireless power transmitter 802 may be implemented in a car, e.g., as part of the infotainment system. Other implementations are possible.

Wireless power receiver 804 may be implemented in, e.g., any mobile device, such as a smartphone, tablet, laptop, etc. Wireless power receiver 804 may also be implemented in a fixed or semi-fixed device, such as a smart thermostat, smart speaker, etc. Other implementations are also possible.

During wireless power transfer, switch 806 is open and driver 814 drives LC tank 106 with signals switched to generate a current $I_{TX}$, e.g., having a frequency between 100 kHz and 360 kHz. The magnetic field generated by transmitter coil $L_{TX}$ as a result of the flow of current $I_{TX}$ induces current $I_{RX}$ to flow through LC tank 108. Switch 808 is open during wireless power transfer, and bridge 816 produces a rectified voltage $V_{RX\_DC}$ based on the voltage across LC tank 108.

In some embodiments, to measure one or more characteristics of the TX LC tank 106 and/or RX LC tank 108, wireless power transfer is temporarily interrupted during a micro-slot for a period of time (e.g., 100 ρs to 200 ρs) and switches 806 and/or 808 are closed to allow the respective LC tank (106 and/or 108) to resonate so that one or more parameters of the LC tank are measured.

In some embodiments, the shorting of switches 806 and 808 respectively decouple the associated LC tank (106 or 108) from the rest of the circuit.

In some embodiments, driver 814 may be implemented with first and second half-bridges respectively driving opposite terminals of LC tank 106. Other implementations are also possible.

In some embodiments, bridge 816 may be implemented with a diode bridge rectifier. In some embodiments, bridge 816 may be implemented with a synchronous rectifier. Other implementations are also possible.

In some embodiments, switches 806 and 808 may be implemented by switching transistors in a full bridge of driver 814 and transistors in bridge 814, respectively.

In some embodiments, switch 808 may be omitted.

Controller 812 may be implemented, e.g., as a general purpose or custom microcontroller including combinatorial logic coupled to a memory. Other implementations are also possible.

Controller 812 may be perform, either directly or via another circuit (such as amplifier, ADC, analog or digital filter(s), etc.) one or more (or all) measurements of characteristics of LC tank 108. Controller 812 may also control bridge 812.

Controller 810 may be implemented, e.g., as a general purpose or custom microcontroller including combinatorial logic coupled to a memory. Other implementations are also possible.

Controller 810 may be perform, either directly or via another circuit (such as amplifier, ADC, analog or digital filter(s), etc.) one or more (or all) measurements of characteristics of LC tank 106. Controller 810 may also control driver 814.

In some embodiments, controllers 810 and 812 may cooperate to perform, e.g., method 600.

In some embodiments, during the micro-slot the wireless power transmitter stops sending power and shorts the TX LC tank 106. In some embodiments, the TX LC tank 106 may be shorted at a particular phase within the switching cycle to allow enough energy to be stored into the TX LC tank 106 to allow for free oscillations and allow for measuring/determine the Q factor.

In some embodiments, the wireless power receiver also shorts the RX LC tank 106 during the micro-slot. For example, in some embodiments, the wireless power receiver detects a sudden change in the coil $L_{RX}$ and bridge 186 operating variables and shorts the RX LC tank 108 in response to the detected sudden change.

Figure 9:
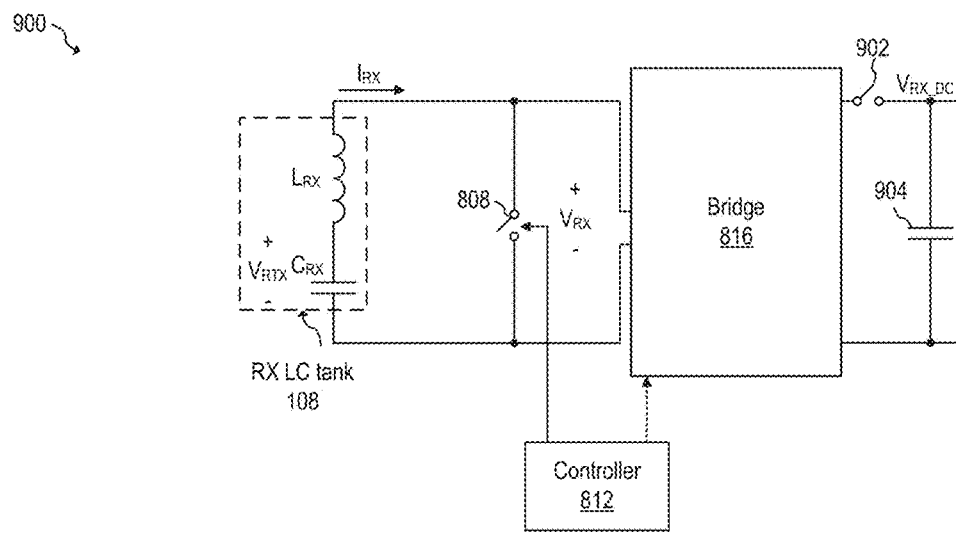
FIG. 9 shows a wireless power receiver, according to an embodiment of the present invention.

In some embodiments, the energy from the RX LC tank 108 is not lost into the DC side of the rectifier 816 by, e.g., shorting the RX LC tank 108 or using a block switch between the DC side of the rectifier and the rest of the RX system including the DC side filter capacitors. For example, FIG. 9 shows wireless power receiver 900, according to an embodiment of the present invention. Wireless power receiver 804 may be implemented as wireless power receiver 900.

As shown in FIG. 9, wireless power receiver 900 includes switch 902, e.g., for isolating RX LC tank 108 during a micro-slot. For example, in some embodiments, switch 902 is closed during wireless power transfer, and is open at the beginning of the micro-slot. In some embodiments, switch 902 is opened at the same time as RX LC tank 108 is shorted.

By isolating RX LC tank 108 from the circuits coupled to the output of the rectifier during a micro-slot, some embodiments advantageously avoid corrupted measurements of the characteristics of the LC tank (e.g., Q factor) that may be caused by current consumed by circuits coupled to the output of the bridge 816.

In some embodiments, during the micro-slot, the wireless power receiver may be able to use a limited amount of current from the DC filter capacitor 904. In some embodiments, it may be advantageous to reduce the output current of the wireless power receiver during the micro-slot, e.g., to avoid using larger DC filtering capacitors 904. Thus, in some embodiments, the wireless power receiver operate at reduced power during a micro-slot.

Figure 10:
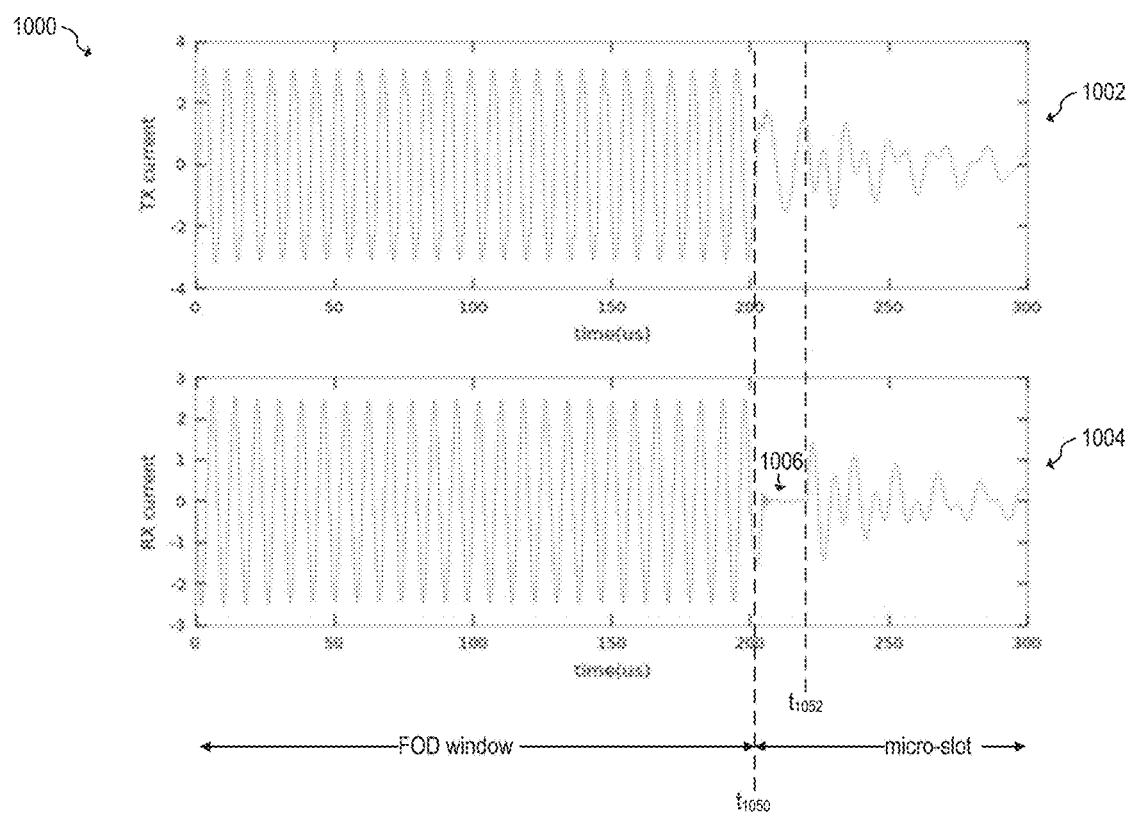
FIGS. 10 and 11 show waveforms of the transmitter receiver currents during a portions of FOD windows and portions of micro-slots, according to embodiments of the present invention.

FIG. 10 shows waveforms 100 of the transmitter current $I_{TX}$ and receiver current $I_{RX}$ during a portion of an FOD window and a portion of a micro-slot, according to an embodiment of the present invention. Waveforms 100 reflect the presence of a foreign object (e.g., an aluminum ring). Curve 1002 corresponds to transmitter current $I_{TX}$ flowing through TX LC tank 106. Curve 1004 corresponds to receiver current $I_{RX}$ flowing through RX LC tank 108.

As shown in FIG. 10, power transfer occurs during the FOD window (e.g., to allow the wireless power receiver to measure the received power and report it in an RP packet). The micro-slot begins after the FOD window ends and power transfer stops.

As shown in FIG. 10, in some embodiments, the micro-slot begins simultaneously with the shorting of the TX LC tank (e.g., by closing switch 806) at time $t_{1050}$. Once the TX LC tank is shorted, the TX LC tank resonates at a first frequency (e.g., as can be seen in the interval between time $t_{1050}$ and time $t_{1052}$).

As shown by curve 1004, the shorting of the TX LC tank causes a change in the shape of the receiver current $I_{RX}$ (e.g., plateau 1006, e.g., as shown between times $t_{1050}$ and $t_{1052}$). Such shape change (e.g., a disruption in the periodicity of the first derivative of the receiver current $I_R$x, such as caused by a plateau) may be detected by the wireless power receiver. In response to detecting that the TX LC tank was shorted, the wireless power receiver may short the RX LC tank (e.g., by closing switch 808) at time $t_{1052}$. In some embodiments, the wireless power receiver may short the RX LC tank immediately upon detection of the shorting of the TX LC tank. In some embodiments, the wireless power receive may short the RX LC tank a delay time after the shorting of the TX LC tank. In some embodiments, the wireless power receiver does not short the RX LC tank.

Once both LC tanks (e.g., 106 and 108) are shorted, the transmitter current $I_{TX}$ and the receiver current $I_{RX}$ both show two frequencies (e.g., one corresponding to the resonance frequency of the TX LC tank and one corresponding to the resonance frequency of the RX LC tank), as can be seen in curves 1002 and 1004 after time $t_{1052}$. Thus, in some embodiments, during the micro-slot and when both LC tanks are short, the ITX waveform may include information about characteristics of the TX LC tank (e.g., in a first frequency) and information about characteristics of the RX LC tank (e.g., in a second frequency).

Thus, in some embodiments in which both the wireless power transmitter and the wireless power receiver short their respective coils, both the wireless power transmitter and the wireless power receiver may sample their respective waveforms (e.g., $I_{TX}/V_{TX}$ and $I_{RX}/V_{RX}$, respectively) and both can extract information about the power loss. In some embodiments, a micro-slot with a length, e.g., between 100 μs and 200 μs may be long enough to sample enough information to estimate the decay rates and frequency content.

In some embodiments, the proximity of the foreign object to the wireless power transmitter and to the wireless power receiver may affect the Q factors measured at the wireless power transmitter (e.g., based on the $I_{TX}$) and at the wireless power receiver (e.g., based on the $I_{RX}$). For example, a Q factor determination at a first frequency as determined based on $I_{TX}$ may fail to detect a foreign object while the determination of the Q factor determination at the first frequency as determined based on $I_{RX}$ may correctly detect the foreign object. Thus, in some embodiments, a foreign object is detected if it the measurement of the Q factor based on $I_{RX}$ or based on $I_{TX}$ is indicative of the presence of a foreign object.

In some embodiments, discrepancies between characteristics of the resonance waveforms at the TX LC tank and RX LC tank during the micro-slot when both LC tanks are shorted may be indicative of which coil (e.g., $L_{RX}$ or $L_{TX}$) is more proximate to the foreign object. Thus in some embodiments, determining the presence of a foreign object may be based on characteristics associated with the TX LC tank and with the RX LC tank, as measured by both.

Figure 11:
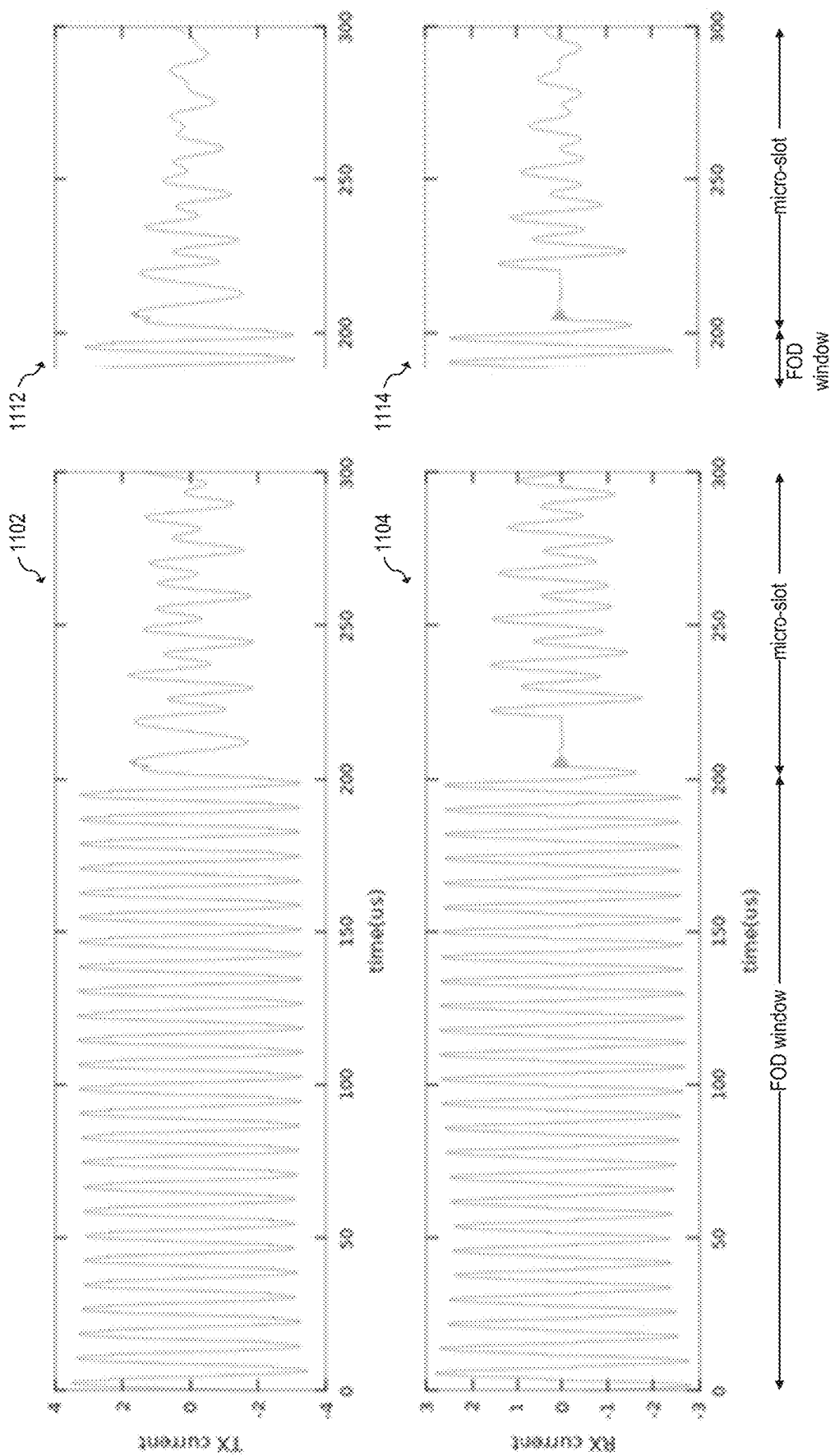

FIG. 11 shows waveforms 1100 of the transmitter current $I_{TX}$ and receiver current $I_{RX}$ during a portion of an FOD window and a portion of a micro-slot, according to an embodiment of the present invention. Curve 1102 corresponds to transmitter current $I_{TX}$ flowing through TX LC tank 106 in the absence of a foreign object. Curve 1104 corresponds to receiver current $I_{RX}$ flowing through RX LC tank 108 in the absence of a foreign object. Curve 1112 corresponds to transmitter current $I_{TX}$ flowing through TX LC tank 106 in the presence of a foreign object. Curve 1114 corresponds to receiver current $I_{RX}$ flowing through RX LC tank 108 in the presence of a foreign object.

As can be seen from FIG. 11, the rate of decay of the resonance oscillations during the micro-slot is faster when a foreign object is present. Such rate of decay may be captured by measuring or determining the Q factor or damping factor of the oscillations. In embodiments exhibiting more than one frequency of oscillations, the Q factor and/or damping factor may be measured or determined for each frequency.

In some embodiments, in addition to Q factor and/or damping factor and/or resonance frequency for each of the LC tanks (106, 108), other characteristics associated with the LC tanks may be determined during the micro-slot. For example, in some embodiments, the resistance R associated with the inductance of the TX LC tank and RX LC tank.

In some embodiments, determining the change in resistance R due to the presence of a foreign object may advantageously allow for the estimation of power loss associated with the foreign object. For example, the wireless power transmitter may use an expected value of current $I_{TX}$ at a particular power level and the difference in resistance associated with the presence of a foreign object to determine the expected power loss $P_{loss}$. For example, in some embodiments, the power loss may be estimated by $$P_{loss} = I^2(R_{TX} + R_{RX}) \quad (4)$$

where $R_{TX}$ and $R_{RX}$ may be the resistance associated with the first and second oscillation frequencies. In some embodiments, R may be determined for each resonance frequency by $$R = \frac{2\pi f_o L}{Q} \quad (5)$$

In some embodiments, the RP/Q packet includes information about the first and second resonance frequencies, and about the power loss as determined by the wireless power receiver based on measurements performed by the wireless power receiver during the FOD window. For example, in some embodiments, the RP/Q packet includes a resistance field and an average power received field. In some embodiments, the resistance field of the RP/Q packet includes measured or determined values, by the wireless power receiver, of the nominal resistance associated with the coil $L_{RX}$, the resistance associated with the first resonance frequency ($R_{f1}$), the resistance associated with the second resonance frequency ($R_{f2}$), a difference ($\Delta R_{f1}$) between $R_{f1}$ and a reference resistance $R_{ref}$, and/or a difference ($\Delta R_{f2}$) between $R_{f2}$ and a reference resistance $R_{ref}$. In some embodiments, the differences $\Delta R_{f1}$ and $\Delta R_{f2}$ may be obtained by subtracting the temperature and current-level compensated resistance of the RX coil $L_{RX}$, RX friendly objects and RX switching elements from the estimated values obtained from the sampled data.

In some embodiments, the RP/Q packet also includes information about a reference Q factor at heavy loads. For example, in some embodiments, the reference Q factor at heavy load is determined by the manufacturer and represents the Q factor that a reference wireless power transmitter (e.g., such as a wireless power transmitter using an MP-A1 standard coil according to the Qi standard) would observe in the presence of the wireless power receiver in the absence of foreign objects and at a predetermined heavy load (e.g., 5

W). In some embodiments, such reference Q factor is stored in a non-volatile memory of the wireless power receiver. In some embodiments, the reference Q factor at heavy loads may advantageously be used to determine whether Q factors measured during the micro-slot (e.g., at heavy loads) is indicative of the presence of foreign objects.

In some embodiments, the wireless power transmitter may use information received from the wireless power receiver in the RP packets (e.g., RP/3 and RP/Q), as well as in the (e.g., calibrated) SIG packet and FOD Status packets (e.g., FOD/qf and FOD/rf, as described in more detail below) to generate a model of the wireless power transfer system. Such model may be used to predict power loss at different power transfer levels (e.g., 1 W, 2 W, 4 W, 5 W, 8 W, 10 W, 12, W, 15 W, 30 W, 45 W or other), and make a decision on whether to report a foreign object detection and negotiated power transfer levels.

In some embodiments, the wireless power receiver and the wireless power transmitter cooperate to determine power dissipation and quality factor values for both the TX LC tank and RX LC tank, thereby advantageously allowing for improved foreign object detection and improved power level negotiation.

Advantages of some embodiments include an improvement in safety in EPP mode with respect to, e.g., the 1.2.3 or 1.2.4 Qi specification. For example, some embodiments advantageously reduce the chance for foreign objects to enter the wireless power transfer field during calibration by two orders of magnitude when compared with the 1.2.3 or 1.2.4 Qi specification. Such improvements may be desirable in various applications such as in automotive applications.

In an embodiment of the present invention, FOD is performed during the ping process and before wireless power transfer begins. FOD is performed by estimating the amount of power that a foreign object consumes using the quality (Q) factor performed during the ping step and information from the signal strength (SIG) packet. For example, in an embodiment, the SIG packet is used by the transmitter to extract information about the relative position of the receiver. The extracted information is used together with quality factor and resonant frequency information to determine how much power is being consumed by a foreign object. The transmitter then may determine whether a foreign object is not detected (and send an ACK) or whether a foreign object is detected (and send a NAK). In some embodiments, the transmitter may perform limited power transfer when a foreign object is detected (e.g., limit power to 5 W instead of 15 W) instead of completely preventing power transfer from starting.

Some embodiments, therefore, are advantageously capable of detecting foreign objects during the ping process instead of waiting, e.g., for the wireless power transfer to begin before performing FOD.

The quality factor measured by the wireless power transmitter (e.g., during step 604 or 618) may change as the wireless power receiver moves further away from the charging surface. For example, when the wireless power receiver is very close to the charging surface, the quality factor may be low. As the wireless power receiver goes higher above the charging surface, the quality factor may increase. In some cases, at even higher distances, the quality factor decreases, e.g., due to friendly object interactions.

Figure 12:
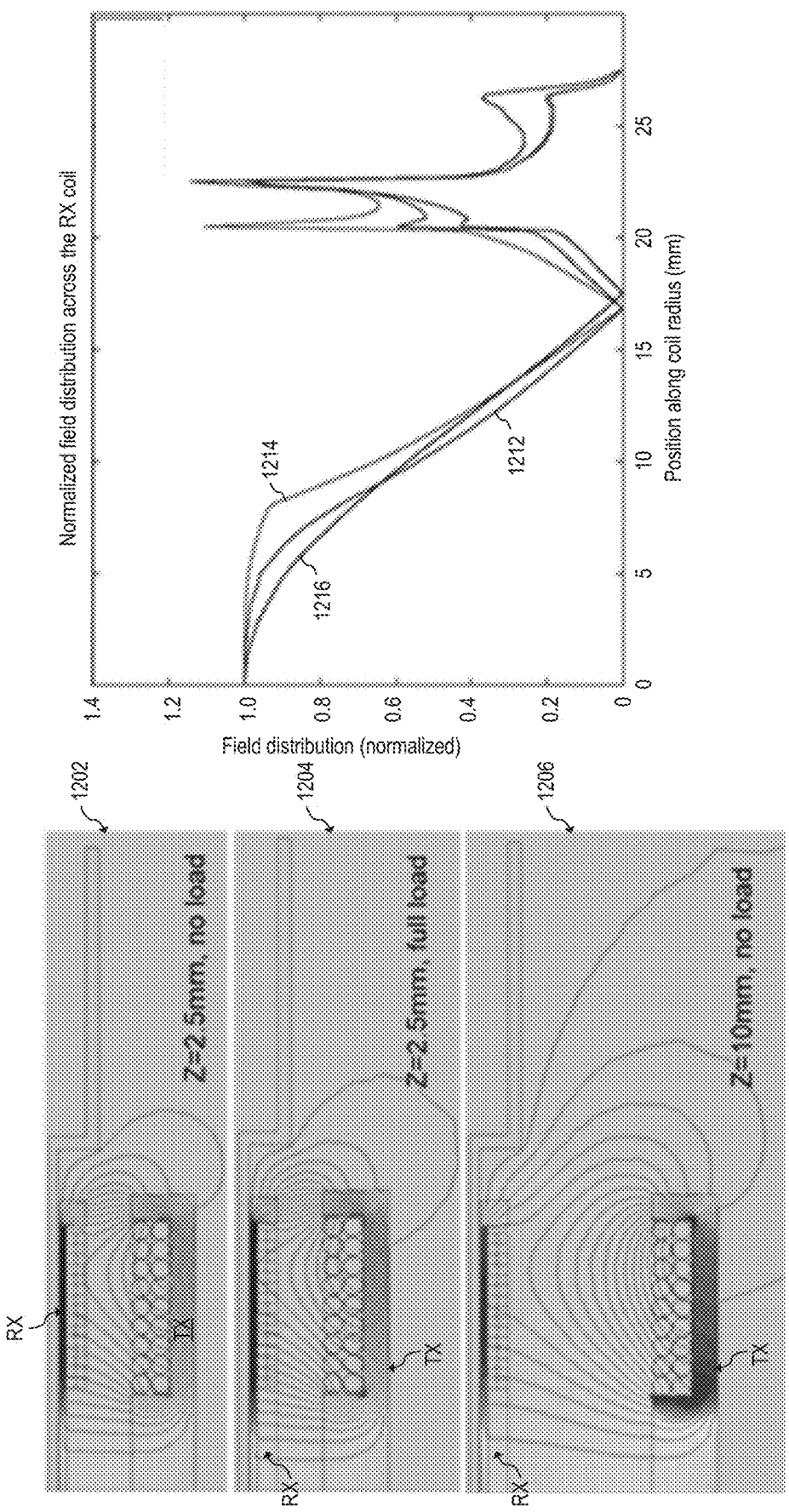
FIG. 12 shows field distributions and field distribution changes with respect to the distance between the wireless power transmitter and receiver, according to an embodiment of the present invention.

When the wireless power transmitter receives the FOD status packet (e.g., at time $t_{304}$ or $t_{504}$), the wireless power transmitter may not have enough information to predict the losses in the foreign object during power transfer. For example, some wireless power receivers operate at lower TX coil currents, in which case the foreign object may not significantly heat. Some other wireless power receivers may operate at high TX coil currents, in which case the foreign object may heat significantly. Some receivers may operate at 5 V and 12 V, and foreign object loses may be very different at these two operating points. For example, FIG. 12 shows field distributions and field distribution changes with respect to the distance between the wireless power transmitter and receiver, according to an embodiment of the present invention. Field distributions 1202 correspond to a no-load condition in which the wireless power transmitter (TX) and the wireless power receiver (RX) are at a distance of 2.5 mm (also referred to as height Z=2.5 mm). Field distributions 1204 correspond to a full-load condition in which the wireless power transmitter (TX) and the wireless power receiver (RX) are at a distance of 2.5 mm (Z=2.5 mm). Field distributions 1206 correspond to a no-load condition in which the wireless power transmitter (TX) and the wireless power receiver (RX) are at a distance of 10 mm (Z=10 mm). Curve 1212 illustrates the change in field distribution as the wireless power receiver changes position along the coil radius for the no-load, Z=2.5 mm condition. Curve 1214 illustrates the change in field distribution as the wireless power receiver changes position along the coil radius for the full-load, Z=2.5 mm condition. Curve 1216 illustrates the change in field distribution as the wireless power receiver changes position along the coil radius for the no-load, Z=10 mm condition.

Conventionally (e.g., as implemented in 1.2.3 or 1.2.4 Qi specification), the quality factor measurements occur before power transfer and may not accurately predict power lost during power transfer into friendly or foreign objects.

In an embodiment of the present invention, a signal strength (SIG) packet is used to report the calibrated RX power level during ping. The reported level is calibrated to an MP-A1 (MP-A1 is a standard coil according to Qi standard, which is used as a benchmark for calibration purposes) coil for a certain TX coil current and frequency and at two or more Z distances. For example, in some embodiments, the reported levels are:

For Z=1.5 mm, SIG=0xC0;
For Z=2.5 mm, SIG=0x80, and
For Z=5.0 mm, SIG=0x40.

For example, in some embodiments, the Signal Strength packet (e.g., with header 0x01) may include a signal strength value field (e.g., 1 byte) indicative of the degree of coupling between the wireless power transmitter and receiver coils. Other formats of the Signal Strength packet, such as including additional fields and/or additional bytes, and/or having a different arrangement, are also possible.

In some embodiments, the signal strength value field may be calibrated so that:

For Z=1.5 mm, the signal strength value is 0xC0;
For Z=2.5 mm, the signal strength value is 0x80, and
For Z=5.0 mm, the signal strength value is 0x40.

Other calibration mappings may also be used.

Thus, in some embodiments, the (calibrated) Signal Strength packet may be used as an indication of the distance (and the degree of coupling) between the wireless power transmitter and receiver. Such information may be used by some embodiments to better estimate, e.g., the Q factor measurement. Thus, in some embodiments, the expected value and tolerance for determining whether an object is present or not based on the Q factor (e.g., during step 613, or 618) may be based on the Signal Strength packet. For example, when the signal strength packet indicates that the wireless power receiver is farther (e.g., a value of 0x20), the transmitter current $I_{TX}$ would likely be higher so the tolerance to changes in quality factor may be lower than when the signal strength packet indicates that the wireless power receiver is closer (e.g., 0xC0). The expected value of the Q factor may also change based on the Signal Strength packet.

In some embodiments, the monotonicity of the reported level is maintained, thereby assuring compatibility to older versions of the Qi specification (older than and including 1.2.4 and 1.3). The relationship between the power level and the reported level intersect the calibration points of the signal strength packet. In some embodiments, the relationship between the power level and the reported level does not have to be linear.

For example, in some embodiments, the calibration of the signal strength SIG is performed by placing the wireless power receiver at a predetermined first distance from the charging surface of a reference transmitter (e.g., MP-A1), the wireless power transmitter sends a ping and the wireless power receiver replies and the signal strength value is recorded. The same process is performed again for various predetermined points (e.g., 1.5 mm, 2.5 mm, and 5 mm). Then, a correction curve is applied and stored in the wireless power receiver so that the signal strength reported at 1.5 mm corresponds to code 0xC0, 2.5 mm to 0x80, and 5 mm to 0x40.

In some embodiments, the curve mapping the signal strength measurements to signal strength values (e.g., reported in the SIG packet) may be stored as an equation in the wireless power receiver. In some embodiments, the curve may be stored in a look-up table (LUT). Other implementations are also possible.

In some embodiments, an FOD Status packet may be modified, extended, or replaced with a new FOD Status packet (e.g., with header 0x22, using, e.g., mode 1, 2, or 3, also referred to as FOD/rf packet) that includes additional characteristics associated with the wireless power receiver. For example, in some embodiments, the FOD/rf packet sent by the wireless power receiver may be used to report reference characteristics of the wireless power receiver based on a standard coil (e.g., MP-A1) at different heights (Z distances), and/or different signal strength values. For example, in some embodiments, the FOD/rf packet includes:

quality factor and resonance frequency measurements using an MP-A1 coil at different Z distances; and/or quality factor and resonance frequency measurements corresponding to a certain Z height based on the value sent during the signal strength packet (which may use the existing FOD/qf and FOD/rf packets); and/or currents associated with MP-A1 TX coil for different power transfer levels (e.g., for 5 W, 10 W, 15 W).

In some embodiments, the transmitter coil currents may be used to determine if the foreign object heats up or not. For example, reference currents received in the FOD/rf packet may be used by the wireless power transmitter to determine expected power loss at different power levels (e.g., using Equation 4). Thus, in some embodiments, the wireless power transmitter may use expected power loss $P_{loss}$ to determine the maximum power transfer levels under current conditions. For example, if the wireless power transmitter determines (e.g., using Equation 4) based on the transmitter coil reference currents received in a FOD/rf packet that 5 W of power transmission is safe, but 10 W is not safe, it may negotiate (e.g., during the negotiation phase) the wireless power transfer to 5 W. Thus, in some embodiments, having this information available early in the negotiation process (e.g., during the ping step) advantageously allows the wireless power transmitter to provide an informed response to the FOD/qf and the FOD/rf packets.

In some embodiments, the wireless power transmitter may use the quality factor (e.g., from RP/Q or FOD/rf), resonance frequency (e.g., from RP/Q or FOD/rf), signal strength value (e.g., from the SIG packet) and MP-A1 TX coil currents (e.g., from FOD/rf) to calculate the correct ACK/NAK response to the FOD/qf and FOD/rf packets.

In some embodiments, the wireless power transmitter may use the quality factor (e.g., from RP/Q or FOD/rf), resonance frequency (e.g., from RP/Q or FOD/rf), signal strength value (e.g., from the SIG packet) and MP-A1 TX coil currents (e.g., from FOD/rf) to reduce the negotiated power to prevent heating of the foreign object.

In some embodiments, the wireless power transmitter may determine the relative placement of the wireless power receiver based on the SIG, FOD/rf and FOD/qf packets. For example, calibrated signal strength (SIG) packets can provide information about wireless power receiver placement on the charging surface. FOD/qf and FOD/rf packets can provide values for quality (Q) factor and resonance frequency that are corrected/calibrated for changes in Z distance (the distance from the charging surface). In some embodiments, reporting the expected MP-A1 coil current for different RX power levels may advantageously provide information to the transmitter during negotiation about the expected losses in foreign objects during power transfer.

Advantages of some embodiments include that, in response to an error condition (e.g., a NAK transmitted by the wireless power transmitter), some embodiments advantageously are capable of performing a recalibration (e.g., transition between the power transfer phase, to the calibration phase, and back to the power transfer phase) without performing the startup sequence, e.g., as illustrated in FIG. 2 (e.g., selection phase, ping phase, identification and configuration phase, and negotiation phase).

Example embodiments of the present invention are summarized here. Other embodiments can also be understood from the entirety of the specification and the claims filed herein.

Example 1. A method including: wirelessly transmitting power using a transmitter LC tank to a wireless power receiver having a receiver LC tank; while wirelessly transmitting power, receiving a first received power packet from the wireless power receiver, the first received power packet including a received power value field indicative of a power level received by the wireless power receiver; determining a first power difference between transmitted power and received power based on the first received power packet; calculating a first received power compensation factor based on the first power difference; interrupting wirelessly transmitting power for a first slot period after receiving the first received power packet; performing a first measurement of a first signal associated with the transmitter LC tank during the first slot period; determining a first Q factor value based on the first measurement; comparing the first Q factor value with a reference Q factor value; and detecting a metallic object based on the comparison.

Example 2. The method of example 1, further including receiving a foreign object status packet from the wireless power receiver, and extracting the reference Q factor value from the foreign object status packet.

Example 3. The method of one of examples 1 or 2, where the foreign object status packet includes a plurality of quality factor values associated with respective coil proximities between a receiver coil of the receiver LC tank and a reference transmitter coil.

Example 4. The method of one of examples 1 to 3, where the foreign object status packet includes a plurality of resonance frequency values associated with respective coil proximities between a receiver coil of the receiver LC tank and a reference transmitter coil.

Example 5. The method of one of examples 1 to 4, further including: when the first Q factor value and the reference Q factor value have a difference that is lower than a threshold, accepting the first received power compensation factor as a calibration factor; and when the first Q factor value and the reference Q factor value have a difference that is higher than the threshold, detecting the metallic object.

Example 6. The method of one of examples 1 to 5, where the threshold is a fixed threshold.

Example 7. The method of one of examples 1 to 6, where the threshold is based on a proximity of a receiver coil of the receiver LC tank to a transmitter coil of the transmitter LC tank.

Example 8. The method of one of examples 1 to 7, further including: receiving a signal strength packet from the wireless power receiver; and determining the proximity of the receiver coil to the transmitter coil based on the signal strength packet.

Example 9. The method of one of examples 1 to 8, further including transmitting a NAK to the wireless power receiver when the first Q factor value and the reference Q factor value have a difference that is higher than the threshold.

Example 10. The method of one of examples 1 to 9, where accepting the first received power compensation factor as the calibration factor includes applying the first received power compensation factor in a subsequent power difference determination in response to a subsequent received power packet.

Example 11. The method of one of examples 1 to 10, further including: after receiving the first received power packet and before interrupting wirelessly transmitting power, receiving a second received power packet from the wireless power receiver, where the first received power packet is associated with a first operating point and the second received power packet is associated with a second operating point difference than the first operating point; and after receiving the second received power packet: determining a second power difference between transmitted power and received power based on the second received power packet, and calculating a second received power compensation factor based on the second power difference.

Example 12. The method of one of examples 1 to 11, further including: receiving a further received power packet while wirelessly transmitting power during a power transfer phase after a calibration phase; in response to the further received power packet, transmitting an ACK or a NAK to the wireless power receiver; and transmitting, by the wireless power receiver, the first received power packet in response to the ACK being transmitted to the wireless power receiver in response to the further received power packet.

Example 13. The method of one of examples 1 to 12, further including: performing a second measurement of a second signal associated with the receiver LC tank during the first slot period; and determining a second Q factor value based on the second measurement, where detecting the metallic object is further based on the second Q factor value.

Example 14. The method of one of examples 1 to 13, further including, during the first slot period, shorting the transmitter LC tank and the receiver LC tank.

Example 15. The method of one of examples 1 to 14, further including: during the first slot period, detecting, by the wireless power receiver, the shorting of the transmitter LC tank; and shorting the receiver LC tank in response to detecting the shorting of the transmitter LC tank.

Example 16. The method of one of examples 1 to 15, where the wireless power receiver includes: a bridge rectifier coupled to the receiver LC tank; and a switch coupled to an output of the bridge rectifier, the method further including opening and keeping open the switch during the first slot period.

Example 17. The method of one of examples 1 to 16, a first time period between receiving the first received power packet and a beginning of the first slot period is 200 ms or less.

Example 18. The method of one of examples 1 to 17, where the first received power packet includes a mode field set to a value indicating that of the received power value field of the first received power packet is indicative of a light load calibration value and a response from a wireless power transmitter is requested.

Example 19. The method of one of examples 1 to 18, further including: performing a second measurement of a second signal associated with the receiver LC tank during the first slot period; and determining a second Q factor value based on the second measurement, where detecting the metallic object is further based on the second Q factor value.

Example 20. The method of one of examples 1 to 19, further including: after receiving the first received power packet, receiving a second received power packet from the wireless power receiver while wirelessly transmitting power; transmitting an ACK to the wireless power receiver in response to the second received power packet while wirelessly transmitting power; determining a second power difference between transmitted power and received power based on the second received power packet; calculating a second received power compensation factor based on the second power difference; interrupting wirelessly transmitting power for a second slot period after transmitting the ACK in response to the second received power packet; performing a second measurement of the first signal during the second slot period; determining a second Q factor value based on the second measurement; and detecting a metallic object based on the second Q factor value.

Example 21. The method of one of examples 1 to 20, further including receiving a signal strength packet, and determining a coil proximity of a receiver coil of the receiver LC tank to a transmitter coil of the transmitter LC tank.

Example 22. The method of one of examples 1 to 21, where the signal strength packet includes a signal strength value field, where a signal strength value field of 0xC0 is indicative of a coil proximity of 1.5 mm, where a signal strength value field of 0x80 is indicative of a coil proximity of 2.5 mm, and where a signal strength value field of 0x40 is indicative of a coil proximity of 5 mm.

Example 23. The method of one of examples 1 to 22, further including receiving a foreign object status packet from the wireless power receiver that includes a plurality of reference currents associated with respective power transfer levels between a receiver coil of the receiver LC tank and a reference transmitter coil.

Example 24. The method of one of examples 1 to 23, further including, determining a maximum power transfer level based on the reference currents.

Example 25. The method of one of examples 1 to 24, where the wireless power receiver is implemented in phone, tablet, or computer.

Example 26. A wireless power transmitter including: a transmitter LC tank including a transmitter coil; and a controller configured to: cause the transmitter LC tank to wirelessly transmit power to a wireless power receiver; receive a first received power packet from the wireless power receiver, the first received power packet including a power received field indicative of a power level received by the wireless power receiver; determine a first power difference between transmitted power and received power based on the first received power packet; calculate a first received power compensation factor based on the first power difference; after receiving the first received power packet, cause an interruption in the wireless transmission of power from the transmitter LC tank for a first slot period; perform a first measurement of a first signal associated with the transmitter LC tank during the first slot period; determine a first Q factor value based on the first measurement; compare the first Q factor value with a reference Q factor value; and detect a metallic object on a charging field of the transmitter LC tank based on the comparison.

Example 27. A wireless power system including: a wireless power receiver including a receiver LC tank; and a wireless power transmitter including a transmitter LC tank and a controller configured to: cause the transmitter LC tank to wirelessly transmit power to the receiver LC tank; receive a first received power packet from the wireless power receiver, the first received power packet including a power received field indicative of a power level received by the wireless power receiver; determine a first power difference between transmitted power and received power based on the first received power packet; calculate a first received power compensation factor based on the first power difference; after receiving the first received power packet, cause an interruption in the wireless transmission of power from the transmitter LC tank for a first slot period; perform a first measurement of a first signal associated with the transmitter LC tank during the first slot period; determine a first Q factor value based on the first measurement; when the first Q factor value and a reference Q factor value have a difference that is lower than a threshold, accept the first received power compensation factor as a calibration factor; and when the first Q factor value and the reference Q factor value have a difference that is higher than the threshold, detect a metallic object.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   wirelessly transmitting power using a transmitter LC tank to a wireless power receiver having a receiver LC tank;
   while wirelessly transmitting power, receiving a first received power packet from the wireless power receiver, the first received power packet comprising a received power value field indicative of a power level received by the wireless power receiver;
   determining a first power difference between transmitted power and received power based on the first received power packet;
   calculating a first received power compensation factor based on the first power difference;
   interrupting wirelessly transmitting power for a first slot period after receiving the first received power packet;
   closing a switch for the first slot period to allow the transmitter LC tank to resonate;
   performing a first measurement of at least one first parameter associated with the transmitter LC tank during the first slot period;
   determining a first Q factor value based on the first measurement;
   comparing the first Q factor value with a reference Q factor value; and
   detecting a metallic object based on the comparison.

2. The method of claim 1, further comprising receiving a foreign object status packet from the wireless power receiver, and extracting the reference Q factor value from the foreign object status packet.

3. The method of claim 2, wherein the foreign object status packet comprises a plurality of quality factor values associated with respective coil proximities between a receiver coil of the receiver LC tank and a reference transmitter coil.

4. The method of claim 2, wherein the foreign object status packet comprises a plurality of resonance frequency values associated with respective coil proximities between a receiver coil of the receiver LC tank and a reference transmitter coil.

5. The method of claim 1, further comprising:
   when the first Q factor value and the reference Q factor value have a difference that is lower than a threshold, accepting the first received power compensation factor as a calibration factor; and
   when the first Q factor value and the reference Q factor value have a difference that is higher than the threshold, detecting the metallic object.

6. The method of claim 5, wherein the threshold is a fixed threshold.

7. The method of claim 5, wherein the threshold is based on a proximity of a receiver coil of the receiver LC tank to a transmitter coil of the transmitter LC tank.

8. The method of claim 7, further comprising:
   receiving a signal strength packet from the wireless power receiver; and
   determining the proximity of the receiver coil to the transmitter coil based on the signal strength packet.

9. The method of claim 5, further comprising transmitting a NAK to the wireless power receiver when the first Q factor value and the reference Q factor value have a difference that is higher than the threshold.

10. The method of claim 5, wherein accepting the first received power compensation factor as the calibration factor comprises applying the first received power compensation factor in a subsequent power difference determination in response to a subsequent received power packet.

11. The method of claim 1, further comprising:
   after receiving the first received power packet and before interrupting wirelessly transmitting power, receiving a second received power packet from the wireless power receiver, wherein the first received power packet is associated with a first operating point and the second received power packet is associated with a second operating point difference than the first operating point; and
   after receiving the second received power packet:
      determining a second power difference between transmitted power and received power based on the second received power packet, and
      calculating a second received power compensation factor based on the second power difference.

12. The method of claim 1, further comprising:
receiving a further received power packet while wirelessly transmitting power during a power transfer phase after a calibration phase;
in response to the further received power packet, transmitting an ACK or a NAK to the wireless power receiver; and
transmitting, by the wireless power receiver, the first received power packet in response to the ACK being transmitted to the wireless power receiver in response to the further received power packet.

13. The method of claim 1, further comprising:
performing a second measurement of at least one second parameter associated with the receiver LC tank during the first slot period; and
determining a second Q factor value based on the second measurement, wherein detecting the metallic object is further based on the second Q factor value.

14. The method of claim 13, further comprising, during the first slot period, shorting the transmitter LC tank and the receiver LC tank.

15. The method of claim 14, further comprising:
during the first slot period, detecting, by the wireless power receiver, the shorting of the transmitter LC tank; and
shorting the receiver LC tank in response to detecting the shorting of the transmitter LC tank.

16. The method of claim 14, wherein the wireless power receiver comprises:
a bridge rectifier coupled to the receiver LC tank; and
a switch coupled to an output of the bridge rectifier, the method further comprising opening and keeping open the switch during the first slot period.

17. The method of claim 1, a first time period between receiving the first received power packet and a beginning of the first slot period is 200 ms or less.

18. The method of claim 1, wherein the first received power packet includes a mode field set to a value indicating that of the received power value field of the first received power packet is indicative of a light load calibration value and a response from a wireless power transmitter is requested.

19. The method of claim 1, further comprising:
after receiving the first received power packet, receiving a second received power packet from the wireless power receiver while wirelessly transmitting power;
transmitting an ACK to the wireless power receiver in response to the second received power packet while wirelessly transmitting power;
determining a second power difference between transmitted power and received power based on the second received power packet;
calculating a second received power compensation factor based on the second power difference;
interrupting wirelessly transmitting power for a second slot period after transmitting the ACK in response to the second received power packet;
performing a second measurement of the at least one first parameter during the second slot period;
determining a second Q factor value based on the second measurement; and
detecting the metallic object based on the second Q factor value.

20. The method of claim 1, further comprising receiving a signal strength packet, and determining a coil proximity of a receiver coil of the receiver LC tank to a transmitter coil of the transmitter LC tank.

21. The method of claim 20, wherein the signal strength packet comprises a signal strength value field, wherein a signal strength value field of 0xC0 is indicative of a coil proximity of 1.5 mm, wherein a signal strength value field of 0x80 is indicative of a coil proximity of 2.5 mm, and wherein a signal strength value field of 0x40 is indicative of a coil proximity of 5 mm.

22. The method of claim 1, further comprising receiving a foreign object status packet from the wireless power receiver that comprises a plurality of reference currents associated with respective power transfer levels between a receiver coil of the receiver LC tank and a reference transmitter coil.

23. The method of claim 22, further comprising, determining a maximum power transfer level based on the reference currents.

24. The method of claim 1, wherein the wireless power receiver is implemented in phone, tablet, or computer.

25. A wireless power transmitter comprising:
a transmitter LC tank comprising a transmitter coil; and
a controller configured to:
cause the transmitter LC tank to wirelessly transmit power to a wireless power receiver;
receive a first received power packet from the wireless power receiver, the first received power packet comprising a power received field indicative of a power level received by the wireless power receiver;
determine a first power difference between transmitted power and received power based on the first received power packet;
calculate a first received power compensation factor based on the first power difference;
after receiving the first received power packet, cause an interruption in the wireless transmission of power from the transmitter LC tank for a first slot period;
close a switch for the first slot period to allow the transmitter LC tank to resonate;
perform a first measurement of at least one first parameter associated with the transmitter LC tank during the first slot period;
determine a first Q factor value based on the first measurement;
compare the first Q factor value with a reference Q factor value; and
detect a metallic object on a charging field of the transmitter LC tank based on the comparison.

26. A wireless power system comprising:
a wireless power receiver comprising a receiver LC tank; and
a wireless power transmitter comprising a transmitter LC tank and a controller configured to:
cause the transmitter LC tank to wirelessly transmit power to the receiver LC tank;
receive a first received power packet from the wireless power receiver, the first received power packet comprising a power received field indicative of a power level received by the wireless power receiver;
determine a first power difference between transmitted power and received power based on the first received power packet;
calculate a first received power compensation factor based on the first power difference;
after receiving the first received power packet, cause an interruption in the wireless transmission of power from the transmitter LC tank for a first slot period;
close a switch for the first slot period to allow the transmitter LC tank to resonate;

perform a first measurement of at least one first parameter associated with the transmitter LC tank during the first slot period;

determine a first Q factor value based on the first measurement;

when the first Q factor value and a reference Q factor value have a difference that is lower than a threshold, accept the first received power compensation factor as a calibration factor; and when the first Q factor value and the reference Q factor value have a difference that is higher than the threshold, detect a metallic object.

27. The wireless power system of claim 26, wherein the wireless power system is configured to:

perform a second measurement of at least one second parameter associated with the receiver LC tank during the first slot period; and determine a second Q factor value based on the second measurement, wherein detecting the metallic object is further based on the second Q factor value.

* * * * *